(12) United States Patent
Spencer et al.

(10) Patent No.: US 7,837,209 B2
(45) Date of Patent: Nov. 23, 2010

(54) TRI-AXIAL CONTROL DEVICE

(76) Inventors: Adam Micheal Spencer, 7031 14$^{th}$ Ave. SW., Seattle, WA (US) 98106; Deserai Marie Spencer, 7031 14$^{th}$ Ave. SW., Seattle, WA (US) 98106

( * ) Notice: Subject to any disclaimer, the term of this patent is extended or adjusted under 35 U.S.C. 154(b) by 377 days.

(21) Appl. No.: 11/746,866

(22) Filed: May 10, 2007

(65) Prior Publication Data

US 2009/0058023 A1    Mar. 5, 2009

(51) Int. Cl.
*B62B 3/00*     (2006.01)
*B62D 61/06*    (2006.01)
*B62M 1/00*     (2006.01)

(52) U.S. Cl. .................. 280/87.042; 280/87.041; 280/87.01; 280/62; 280/87.03; 280/87.021; 280/87.043; 280/47.11

(58) Field of Classification Search ............ 280/87.041, 280/87.01, 62, 87.03, 87.021, 87.042, 87.043, 280/47.11
See application file for complete search history.

(56) References Cited

U.S. PATENT DOCUMENTS

| 4,123,079 | A | * | 10/1978 | Biskup | ............... | 280/87.042 |
| 4,773,659 | A | * | 9/1988 | Rygiel | ............... | 280/142 |
| 4,835,468 | A | * | 5/1989 | Dumbser et al. | ............... | 324/166 |
| 6,499,751 | B1 | * | 12/2002 | Beleski, Jr. | ............... | 280/87.041 |
| 6,517,093 | B2 | * | 2/2003 | Feng | ............... | 280/87.042 |
| 6,554,302 | B1 | * | 4/2003 | Liu | ............... | 280/87.041 |
| 6,923,459 | B2 | * | 8/2005 | Yeo et al. | ............... | 280/87.041 |
| 7,104,557 | B2 | * | 9/2006 | Chen | ............... | 280/87.041 |
| 2004/0094925 | A1 | * | 5/2004 | Chuang | ............... | 280/87.041 |
| 2004/0178597 | A1 | * | 9/2004 | Tang | ............... | 280/87.041 |
| 2005/0212245 | A1 | * | 9/2005 | Fernandez et al. | ............... | 280/87.041 |

* cited by examiner

*Primary Examiner*—Paul N Dickson
*Assistant Examiner*—John R Olszewski

(57) ABSTRACT

A person rides the Tri-Axial Control Device standing on pedal assemblies. The pedal assemblies are attached to a control axial member thus forming the Tri-Axial Control Device. The control axial member on the vertical stick, can rotate fore and aft, and turns the front skis and/or wheels. Changing the angle of the vertical stick side-to-side changes the pedal angle. If the rider falls forward the front stick can rotate away. Various torsion controls rod assemblies and pedal assemblies can be utilized to create a unique tri axial device. The device can be folded, is lightweight and can be manufactured without welding. No special equipment or training is required to operate the device. In addition to its entertainment uses, the mounting device for portable electronics can also be used for added safety by adding a global positioning system or other electronic signal device, allowing safety personnel to locate the rider.

11 Claims, 22 Drawing Sheets

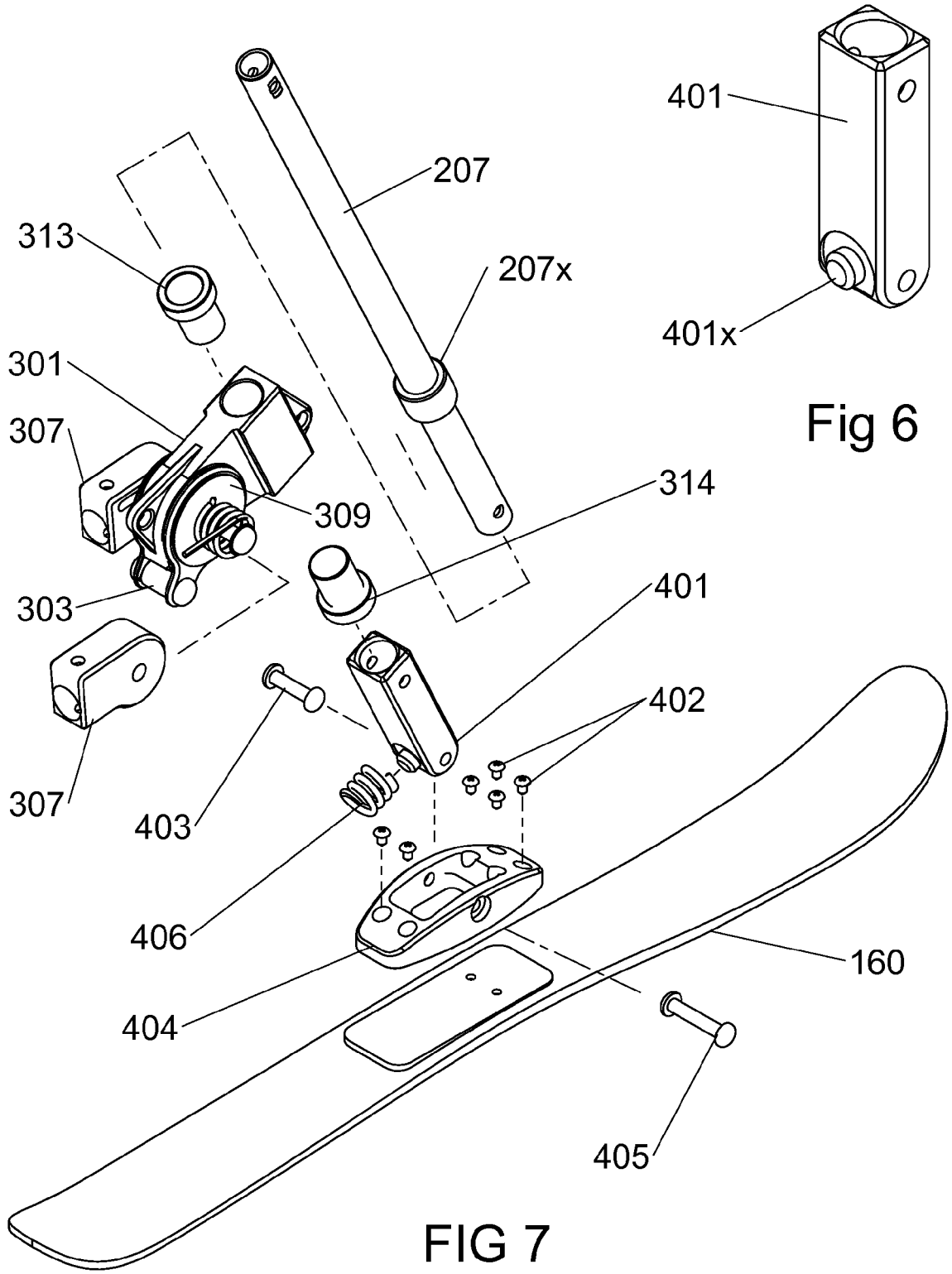

511x KEY SLOT
511y KEY STOP

513x LOCK SLOT

513y LOCK TOOTH

TRI-AXIAL CONTROL DEVICE

CROSS-REFERENCE TO RELATED APPLICATIONS

Tri Platform Control Device, application Ser. No. 11/163,893

FEDERALLY SPONSORED RESEARCH

Not Applicable

SEQUENCE LISTING OR PROGRAM

Not Applicable

BACKGROUND OF THE INVENTION

Field of Invention

This invention relates to ski devices, specifically to a Tri-Axial Control Device, which allows a person to stand on it while skiing. The mounting device can contain a variety of electronic devices for operating by the rider.

BACKGROUND OF THE INVENTION

In recent years the popularity of the cambering vehicle and mechanism with wheels for sport and recreation has increased. In addition, a three-point platform device has been developed with skis for use in the snow named a TRIKKE SKKI. It enables a beginner to ski the slopes quickly. Both of these devices work the same way. They use a universal joint to attach the lateral platforms to the vertical platforms. The universal joints in the frame permit its steering head and handles to swing from side-to-side. This cambering is intended to create an artificial down slope, allowing the vehicle to move forward. However, we found that the device did not create an artificial down slope. When we tested it on level ground, we had to push ourselves off to get moving. In addition, there are three major problems with the TRIKKE SKKI. The first is a safety problem. The front steering column can be dangerous during a fall. The Tri-Axial Control Device solves this major problem with a steering mechanism that rotates out of the way during a fall. When standing on the TRIKKE SKKI, the feet cannot control the ski for and aft, up or down. This is important in controlling the device. The other problem is when standing on the platform when you pick up the front ski you pull yourself over backwards because the front ski is attached to the platform you are standing on. The Tri-Axial Control Device solves these problems that were never before even recognized. The mounting device for attaching portable electronics to sporting equipment has never before been designed.

U.S. Pat. No. 6,517,093 issued to Feng on Feb. 11, 2003 titled Foldable Tricycle contains a vertical platform and a right and left lateral platform. The problem with these is that they are fixed and very ridged. They allow very limited motion of the vehicle. The Tri-Axial Control Device solves this problem with a front torsion control stick and left and right torsion control rods. These move independently of one another. The twisting capability of the torsion control rods allows them to rotate with the use of the control axial members. This allows more movement giving more control of the vehicle. The results achieved by the invention are unexpected and superior, solving a problem previously unrecognized.

U.S. Pat. No. 6,517,093 issued to Feng on Feb. 11, 2003 titled Foldable Tricycle contains assemblies on the right and left lateral platform that are intended to let the platforms rotate to different angles while in a turn so both skis remain on the ground. However, these rotations are very limited. During a turn of approximately 20 degrees, the rear footpad will leave the ground. The rotation is not symmetrical. It causes you to break speed. This also makes it difficult to traverse a steep hill. The Tri-Axial Control Device solves this previously unrecognized problem with the control axial member. The results are new and surprising. The control axial member allows the angle to change without lifting the rear skis off the ground.

U.S. Pat. No. 6,517,093 issued to Feng on Feb. 11, 2003 titled Foldable Tricycle contains a footpad. However, the footpad rests directly on the right and left platform. The Tri-Axial Control Device utilizes a new principle of operation. It has a pedal assembly containing four compression springs and attaches to the right and left torsion control rods and the rear skis. The footpads are part of a unique assembly and not directly resting on top of the control rods as in the Foldable Tricycle. In addition, the unique foot assemblies described later in this document have capabilities that the footpads in the Foldable Tricycle do not have, resulting in an unsuggested way of solving a problem previously unrecognized.

U.S. Pat. No. 6,517,093 issued to Feng on Feb. 11, 2003 titled Foldable Tricycle contains linking assemblies. Those linking assembly are used to attach the front joint assemblies to the lateral platforms and to fold up the device. The Tri-Axial Control Device contains front linking assemblies and aft linking assemblies. They are also used for folding the device up. However, The Tri-Axial Control Device is unique because you can adjust the width for skiing in different terrains. In addition, the linking assemblies have a unique system. The linking assemblies include a hub that contains a double sheer pin with a tooth that has a slot and a compression spring rest on the pin. A second hub includes keyways. The linking assembly can be adjusted to different widths. The spring holds the keyway in place. Thus the Tri-Axial Control Device utilizes a new principle of operation.

In addition, U.S. Pat. No. 6,517,093 issued to Feng on Feb. 11, 2003 titled Foldable Tricycle has a restricted steering bar for and aft. This makes it difficult to ski in powder snow and avoid obstacles. Also, when the front ski is raised to avoid obstacles it changes the position of the rider and throws the rider backwards. This causes the rider to fall backwards. The Tri-Axial Control Device has front steering and foot pedals are hinged so you can lift the front ski and the pedals will not move up or down. It is independent fore and aft. The fixed steering bar does not allow you to rotate the stick completely out of the way. This can be an additional safety hazard. Also, the only way to steer the device is to turn the vertical platform either right or left. In alpine skiing the steering is controlled by the feet on the skis. The Tri-Axial Control Device solves this problem with a steering mechanism that rotates 360 degrees for and aft as well as 360 degrees left and right. Thus the Tri-Axial Control Device utilizes a new principle of operation, solves problems previously unrecognized with superior results.

Further, In addition, U.S. Pat. No. 6,517,093 issued to Feng on Feb. 11, 2003 titled Foldable Tricycle has the back skis directly attached to the lateral platforms. There are no separate foot pedal assemblies. This makes the rider unable to balance the rear skis independently. The rider cannot change the angle of the toes to put the ski tips up. This means there is no control on the ski forward or aft. This makes it difficult to ski on powder. This can also make it difficult to avoid obstacles. It can also cause you to tumble over the handlebars. Because the foot platforms are fixed, the ability to use the feet in steering is not present. This does not imitate parallel skiing. Therefore, the manipulation of the skis cannot be transferred to alpine skiing. Again, the Tri-Axial Control Device solves a problem previously unrecognized with new, unexpected and unsuggested results.

US Pub. No. 2004/0032105, inventor Tsai published on Feb. 19, 2004, titled Foot Propelled Scooter contains a footpad assembly containing a compression spring. The problem with this is it does not aid in the forward motion of the footpads. In addition, if you go over a bump you will feel the bump in both feet. The springs do not give any independent control of the footpads. In the Tri-Axial Control Device the foot pedal assemblies give independent control forward and aft allowing the rider to adjust each ski tip independently as desired. This results in a superior use of compression springs in the footpads.

U.S. Pat. No. 6,575,479 issued Combs on Jun. 10, 2003 titled Three Runner Sled contains a front foot assembly with a spring. However, the spring is exposed to the elements and can easily be damaged or lost through operation. The Tri-Axial Control Device solves this problem by containing the spring in the in the front foot assembly behind the front torsion control stick. In addition, it is difficult to assemble the Three Runner Sled foot assembly. It has to be assembled by somehow pushing the footplate, front stick and spring together while putting the center pin in. The Tri-Axial Control Device is assembled by first putting the spring in a hole in the foot. Next the front torsion control stick in is put into the foot. The front torsion control stick has a knob that holds the spring into the foot. Then just pull back on the front torsion control stick to snap the spring into the stick.

U.S. Pat. No. 4,773,659 issued to Rygiel on Sep. 27, 1988 titled Articulated Ski uses compression springs in front stick. However, the intent of the compression spring used in this device is different than the compression spring used in the Tri-Axial Control Device. Rygiel uses the spring for shock absorption and it is located on the front stick. The spring in the Tri-Axial Control Device is used to adjust the ski tip forward and aft and is located in the front foot assembly, solving an entirely different problem.

U.S. Pat. No. 66,719,310 issued to Lin on Apr. 13, 2004 titled Self-Movable Vehicle contains a method for adjusting the width of the rear frames. The problems with these are that they cannot be adjusted independently. The use of gears also restricts the movement up and down of the rear frames. The Tri-Axial Control Device solves these problems by making the linking assemblies fully independent of each other. The Tri-Axial Control Device also allows rotation up and down through the linking assemblies. Again, we have utilized a new principle of operation and have achieved superior results solving a problem previously unrecognized.

U.S. Pat. No. 7,048,283 issued to Wu on May 23, 2006 titled Folding Structure Of A Front wheel of A Golf Cart contains a linking assembly. However, the purpose of this linking assembly is to attach the front wheel to the device. It has no capabilities of adjusting to different widths as in the Tri-Axial Control Device. The parts contained in the linking assembly of the Tri-Axial Control Device are not similar to the ones contained in the folding Structure of A Front Wheel of A Golf Cart. In addition, The Tri-Axial Control Device parts have a different method of operation and use. Thus the Tri-Axial Control Device utilizes a new principle of operation.

Therefore, the results achieved by the Tri-Axial Control Device are new, unexpected, superior, unsuggested, and surprising. The problems solved by our invention were never before even recognized. Our device utilizes a new principle of operation over previous art, thus proving unobviousness. The fact that those skilled in the art have not implemented anything like our invention, despite its great advantages, indicates that it is not obvious. We have blazed a trail, rather than followed one. Some of the previous art solves different problems than that of the Tri-Axial Control Device. In addition, the fact that a large number of references must be combined to compare to the Tri-Axial Control Device is evidence of unobviousness.

Control Axial Member

The unique forward control axial members on the tri axial angular control device allow the vehicle to more closely imitate skiing. The control axial member is supported by a center ski and stick that can be used to initiate a turn or in breaking. The forward control axial member allows the steering to rotate 360 degrees on two-axis, fore and aft and right and left. This allows the lateral rods to stay parallel to one another while skiing the edge unlike previous art. The vertical stick attached to the forward axial control member has a center shaft that controls both the right and left angular position of the skis. The right and left angle of all the skis are controlled by the vertical stick angle, through hinged lateral control rods for the right and left ski and directly for the forward ski. The control axial member is used to synchronize the angle between the right and left ski using the vertical stick. By changing the angle of the stick, the angle of the lateral control rods and pedals change. This allows a person to be able to transfer their weight to the front or back of the ski, controlling the ski similar to snow skiing. This gives the rider better control of the device in unpacked powder or adverse snow conditions.

The lateral control rods are hinged at the control axial member and at each ski with internal retaining springs. These are used to bring the entire device into a neutral position. It also still allows 360 degrees rotation about the cam. This allows the skier to easily stand on the pedals. Units of previous art cannot do this. They restrict the motion on the steering, the skis, or both, which can cause a person to lose balance during operation.

The forward control axial members also have integral attachment rings on the front and back. This allows the attachment of a rope so that you can tow or be towed. In addition, the unique forward control axial members on this Tri-Axial Control Device also allow it to be folded up. This makes it easy to carry to and from the ski area as well as on the ski lift. It also makes it convenient to store.

Torsion Control Rods (Right and Left)

Each ski has a control rod attached to the control axial member. The device comes with adjustable or stationary lateral rods. Both versions can fold up. The width adjustment allows the rider to adjust the width for individual rider comfort. The width adjustment also can be narrowed for skiing steeper terrain safely. Lin's lateral platforms adjust in width; however, they adjust in one plane (width). On this device the adjustment can be made on three planes (width, height, and length).

Front Torsion Control Stick

There is a vertical stick attached to a forward control axial member. This stick allows a person to change the angle of the skis relative to a slope. The secondary function of the vertical stick allows a person to steer or pick up the stick completely off the snow without affecting the rear skis. It also allows the rider to ski on the back two skis to even more closely imitate alpine skiing. This also adds greater safety for the rider. It allows the rider to avoid obstacles without the danger of falling backwards. A spring is imbedded in the foot of the stick and is attached to the front ski. This spring pushes the ski tip up. The spring also works so that the ski returns to its original position.

Level Pedal Spring Assembly

The level pedal spring assembly is a hinged parallelogram with a compression spring strut attached to the foot pedal and ski. The parallelogram has two links, which transfer the fore and aft load from the foot pedal to the ski through the lower fitting. The compression spring strut assembly is used to adjust the height and load that can be transferred to the ski from the foot pedal. During high speed skiing the foot pedal remains parallel with the ski. You can tell the exact angle of the slope for exact edging.

Angular Spring Pedal Assembly

The angular spring pedal assembly has two pedals that are attached to two rear skis. The springs contained in the unique pedal assembly enables the rider to push either the toe, or heal down allowing the platforms to rotate forward and aft. This also enables the skis to work independently. This allows the rider to balance naturally on the platform. It also allows the rider to change the angle of the ski for better performance. This enables the rider to go over bumps easier The novelty of this is the person has to balance himself on the ski. Balance is not provided by the control mechanism. Previous art designs do not allow you to control the balance of the ski for and aft.

The springs under the pedals are in a protected mount. The primary function is to aid in jumps or in rough terrain. They also help to reduce the vibration in the legs. Previous art contains a tension spring in the pedal. The present device differs in that it contains a compression spring. A compression spring lasts longer and picks the ski tip up. In addition, the unique spring assembly is contained in a case in a pedal assembly for enhanced steering with the feet. The case also protects the springs from damage.

The hinged toe is better for powder and jumping. The ski is allowed to rotate underneath the rider's foot so that the ski tip comes up without the rider having to lean back. This also gives it a better floating advantage in powder and heavy snow.

Wheel Assembly

The wheel assembly has a centering spring system, which keeps the vehicle in an upright position when at slow speeds and at rest. The solid pedal assembly gives an exact control on the fore and aft wheel. There are no moving parts in the pedal assembly other than the springs that center the control rods.

Front Foot Assembly

The front foot assembly has a compression spring which makes sure that the front ski tip comes up if there is no weight on the tail of the ski. This allows the skier to go over large obstacles without digging the tip in.

Front Linking Assembly and Aft Linking Assembly

The front linking assembly and aft linking assemblies act as a hinge. One half of the hinge fits onto the control axial housing and the other half fits onto the linking torque control rod assembly. One half the hinge has the key slot and key stop. The other half has holes to allow the lock pin to be inserted. The lock pin and spring are installed before the front half is assembled. This insures that the lock pin cannot fall out. The lock pin when engaged in the key slot keeps the hinge from rotating. Depressing the lock pin disengages the slot and allows rotations. Various slots at different angles allow a wide choice of positions.

Linking Torque Control Rod Assembly

The linking torque control rod assembly has a linking assembly on each end. The rod is secured and remains stationary. The only adjustment is done through each link assembly.

Non-Adjustable Torque Control Rod Assembly

The non-adjustable torque control rod assembly is a basic bent tube which transfers the angle of the stick directly to the pedal assembly attached to the ski. This is very inexpensive to make and can be installed with quick fasteners or bonded, or attached in various manners to secure it permanently or temporary. This is good for beginners or rental shops because there are no adjustments it is easier to use.

Free Ride Torque Control Rod Assembly

The free ride torque control rod assembly is a parallelogram. One end is attached to the control axial housing and the other end is attached to a pedal assembly. The parallelogram is such that it allows the pedal to move inboard or outboard parallel and independent from one ski to the other allowing a person to adjust the width of the skis instantly right or left. This allows a person to easily make the ski track narrow to get in a crowded lift line or avoid other ski obstacles. And ski very steep and rugged terrain maintaining full control of the edge angle to the ski slope.

Steering Wheel Mechanism

The uniquely elliptical shaped steering wheel is safer than traditional steering wheels. There are no ends to jab a rider in the event of a fall. The steering wheel also attaches to the front torsion control stick differently. It has an upper attachment piece and a lower attachment piece. The ends of the steering wheel rest in these pieces and it is sealed with four bolts. This assembly is attached to the front torsion control stick. The advantage of four bolts is the steering wheel will not loosen up in the event of a fall. The assembly also offers greater stability and control to the device.

Mounting Device for Portable Electronic Equipment

The mounting device for portable electronic equipment allows the rider to have a global positioning system, a gaming device, a music device, or any other portable electronic device attached while skiing the slopes.

Other Advantages

Another advantage the Tri-Axial Control Device has over other art is it contains fewer parts and has no welded parts. Parts can be made by various manufactures and sent to one place to be assembled. This makes it easier and less costly to manufacture. All the parts can hand fit together so it is easily maintained. This also makes it easier and less costly to repair. It also weighs less than previous art.

This emulates skiing better than any other device on the market because you have better control over the skis. You are able to transfer your weight for and aft on the skis and take off the front ski off the ground without affecting your weight or balance on the other skis. This device is designed so you can ski in more varied terrains than other units, with added safety.

The mounting device for portable electronic equipment has many advantages. In addition to providing entertainment for the rider, it can also be used by the rider to find where they are positioned in case they get lost. A device with an electronic signal can also be attached to the mounting device. This will let safety personnel use the device to find a rider when lost or unable to communicate.

The advantages of the tri platform control device will become apparent from a consideration of the ensuing description and drawings.

SUMMARY

The Tri-Axial Control Device offers novice skiers the opportunity to ski the slopes within a short amount of time. It also offers the experienced skier a new way to ski the slopes giving them more of a variety. All ages and skill levels can use the tri-axial angular control device. It allows people to ski safer and easier. There is no need for heavy boots and skis attached to your feet. It can be folded into a small package and is lightweight. It is easy to manufacture and requires no welded parts. It can be made from various materials, from plastics and steels and still retain the original function. The control axial members allow the front stick to rotate 360 degrees forward and aft as well as left and right increasing safety during falls and control of the device. The control axial members also allow the rider to balance the skis forward and aft by changing the weight on the rider's foot. This gives a smooth control from one turn to the next. The multiple pedal configurations allow the rider to adjust his weight according to need for powder or jumping. Due to the unique control axial members the front ski foot and foot pedal assemblies, this device simulates snow skiing better than any other device.

BRIEF DESCRIPTION OF THE DRAWINGS

A fuller understanding of the nature and objects of the present invention will become apparent upon consideration of the following detailed description taken in connection with the accompanying drawings, wherein:

FIG. 6 is a perspective view of the steering hinge fitting.

FIG. 7 is a detailed exploded view of the front ski, forward foot, control axial member, steering shaft.

DRAWINGS

Figure 1:
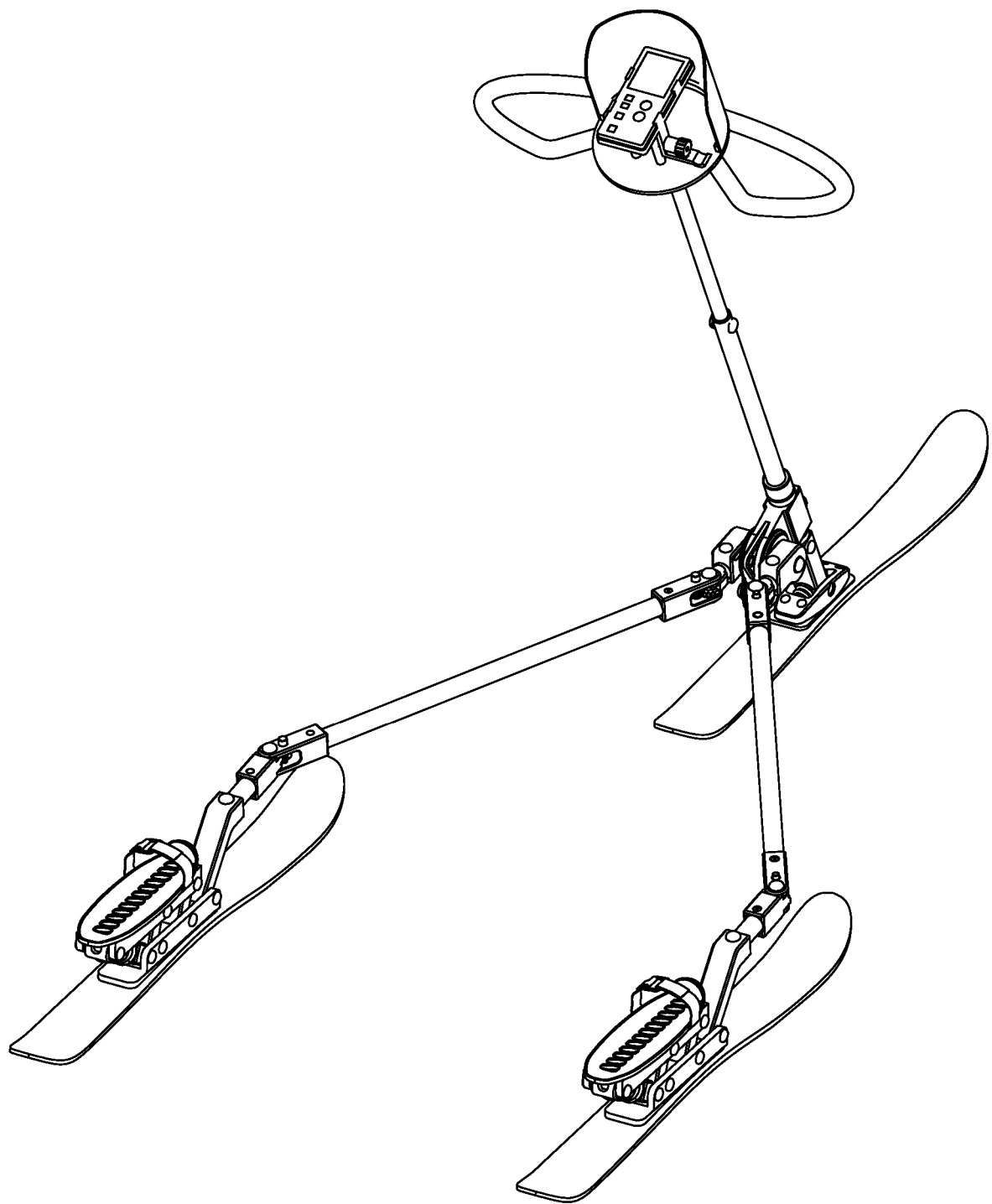
FIG. 1 is a perspective view of the Tri-Axial Control Device with adjustable control rods, level pedal spring assembly, and skis.

Reference Numerals 100 mounting device for portable electronics assembly
101 shield
102 device holder
102x clicker arm
102y clicker
103 clicker stop
104 device
105 holder arm
106 holder arm
107 base
108 bolt
109 bolt
160 ski
200 steering mechanism assembly
201 steering hand loop
202 screws
203 upper steering block -continued 204 screws
205 lower steering block
206 upper torsion steering stick
207 lower torsion steering shaft
207x lower torsion steering shaft knob
300 control axial member
301 forward axial control fitting
301x tooth
301y attachment ring
301z attachment ring
302 main pin
303 snap cam
304 washer
306 washer
307 control axial housing
308 pin
309 rod reset fitting
310 bushing
311 spring
313 steering bushing
314 steering bushing
400 front foot assembly
401 steering hinge fitting
401x knob
402 screw
403 pin
404 forward foot
405 pin
406 compression spring
500 linking torque control rod assembly
501 front torque rod
502 rear torque rod
503 torque rod
510 linking assembly
511 snap cam lockend
511x key slot
511y key stop
512 snap cam pin
513 lock pin
513x lock slot
513y lock tooth
514 aft torque lockend
515 pin
516 lock pin spring
520 linking assembly
600 level pedal spring assembly
601 torque fitting
602 bottom spring support
603 pedal link
604 compression pedal spring
605 upper spring support
606 pedal base
607 pedal strap
608 pin
609 pin
610 spring fitting
611 adjustable spring fitting
612 pin
613 pin
614 pin
615 nut
700 angular pedal spring assembly
701 pin
705 pin
706 torque fitting
707 pedal plate
708 pedal strap
709 screw
710 upper pedal support
711 compression spring
712 screw
713 pedal support fitting
714 pedal pin
800 wheel assembly
801 forward wheel
802 rear wheel
804 front wheelbase
810 rear wheel assembly
811 rear wheelbase -continued 812 pin
813 rear wheel
814 screws
815 washer
816 wheel footpad
816x wheel base upper cavity
816y wheel base lower cavity
817 pin
818 pin
819 torque fitting
820 center pin
821 center pin springs
822 front wheel
823 center pin
900 free ride torque control rod assembly
901 outside torque rod
902 inside torque rod
903 pin
904 pin
905 pin
906 pin
907 lockend
908 lockend
909 adjustment fitting
909x lock stop
910 lock pin

DETAILED DESCRIPTION

Preferred Embodiment

FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33

Referring now to the Drawings:

FIG. 1 is a perspective view of the Tri-Axial Control Device with adjustable control rods, level pedal spring assembly, and skis.

Figure 2:
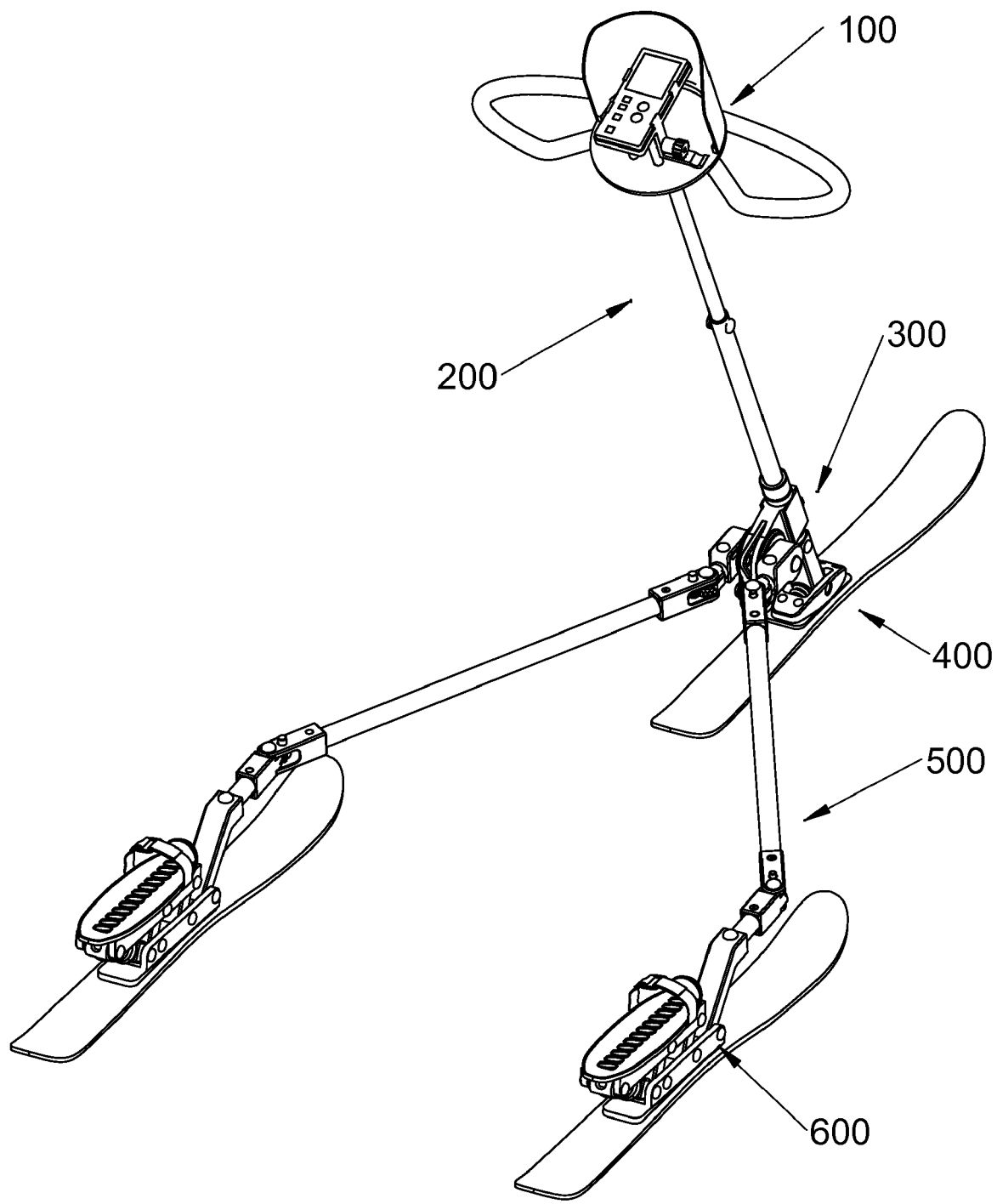
FIG. 2 is a detailed perspective view of the Tri-Axial Control Device with adjustable control rods, level pedal spring assembly, and skis.

FIG. 2 shows the major parts and assemblies to the Tri-Axial Control Device in perspective view. A mounting device for portable electronics (100) is attached to a steering wheel mechanism assembly (200). The steering wheel mechanism assembly (200) has a control axial member (300) and a front foot assembly (400) attached. The control axial member (400) has two torque control rod assemblies (500) attached. Each torque control rod assembly (500) has a level pedal spring assembly (600) attached.

Figure 3:
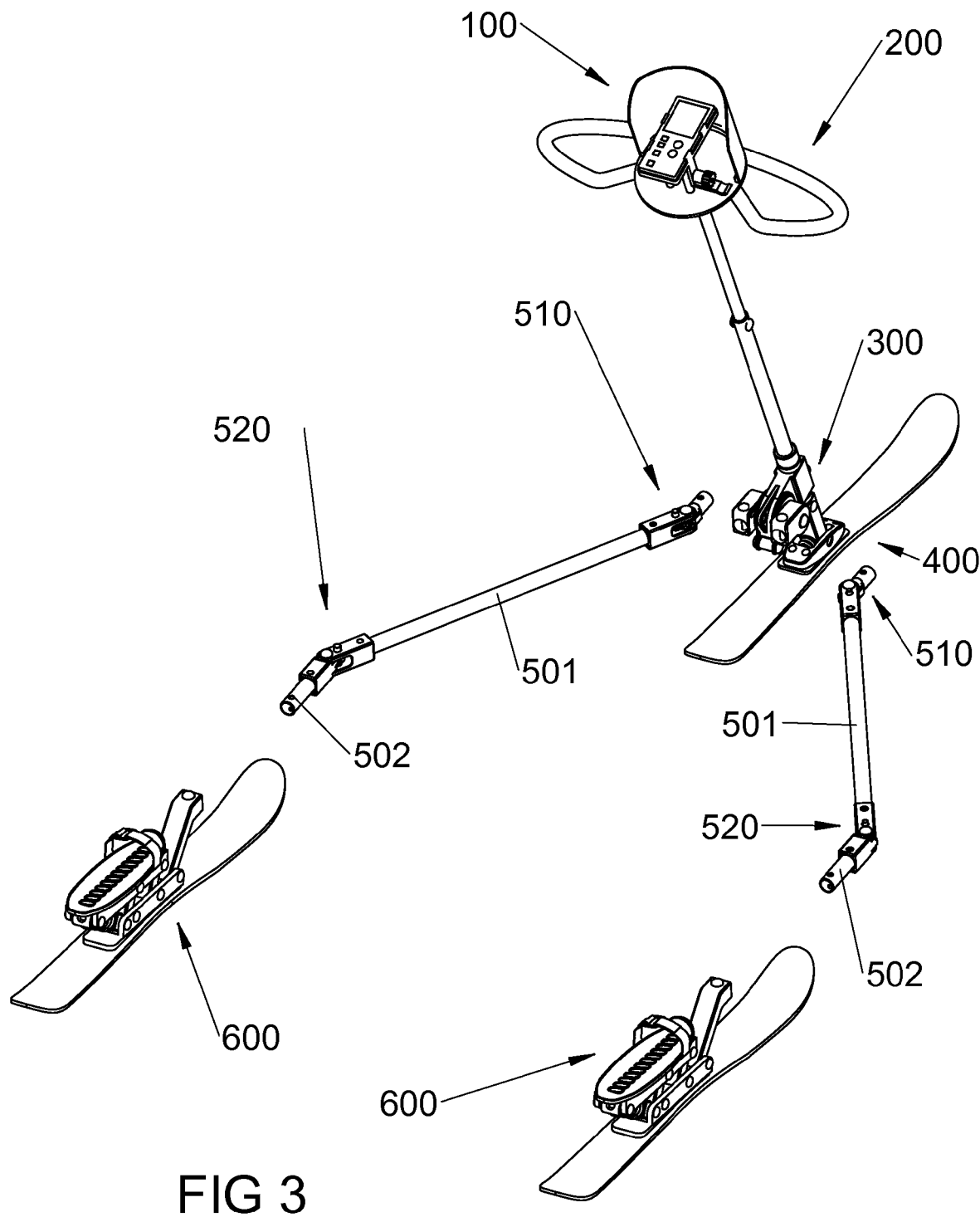
FIG. 3 is a detailed exploded view of the Tri-Axial Control Device with adjustable control rods and skis.

FIG. 3 is a detailed exploded view of the Tri-Axial Control Device. A mounting device for portable electronics (100) is attached to a steering wheel mechanism assembly (200). The steering wheel mechanism (200) it attached to the control axial member (300) and the front foot assembly (400). The control axial member (300) a linking assembly (510) attached on the right and a linking assembly (510) attached on the right. Each linking assembly (510) in the front is attached to a front torque rod (501). The rear of the front torque rods (501) is attached to a linking assembly (520). Each aft linking assembly is attached to the level pedal spring assembly.

Figure 4:
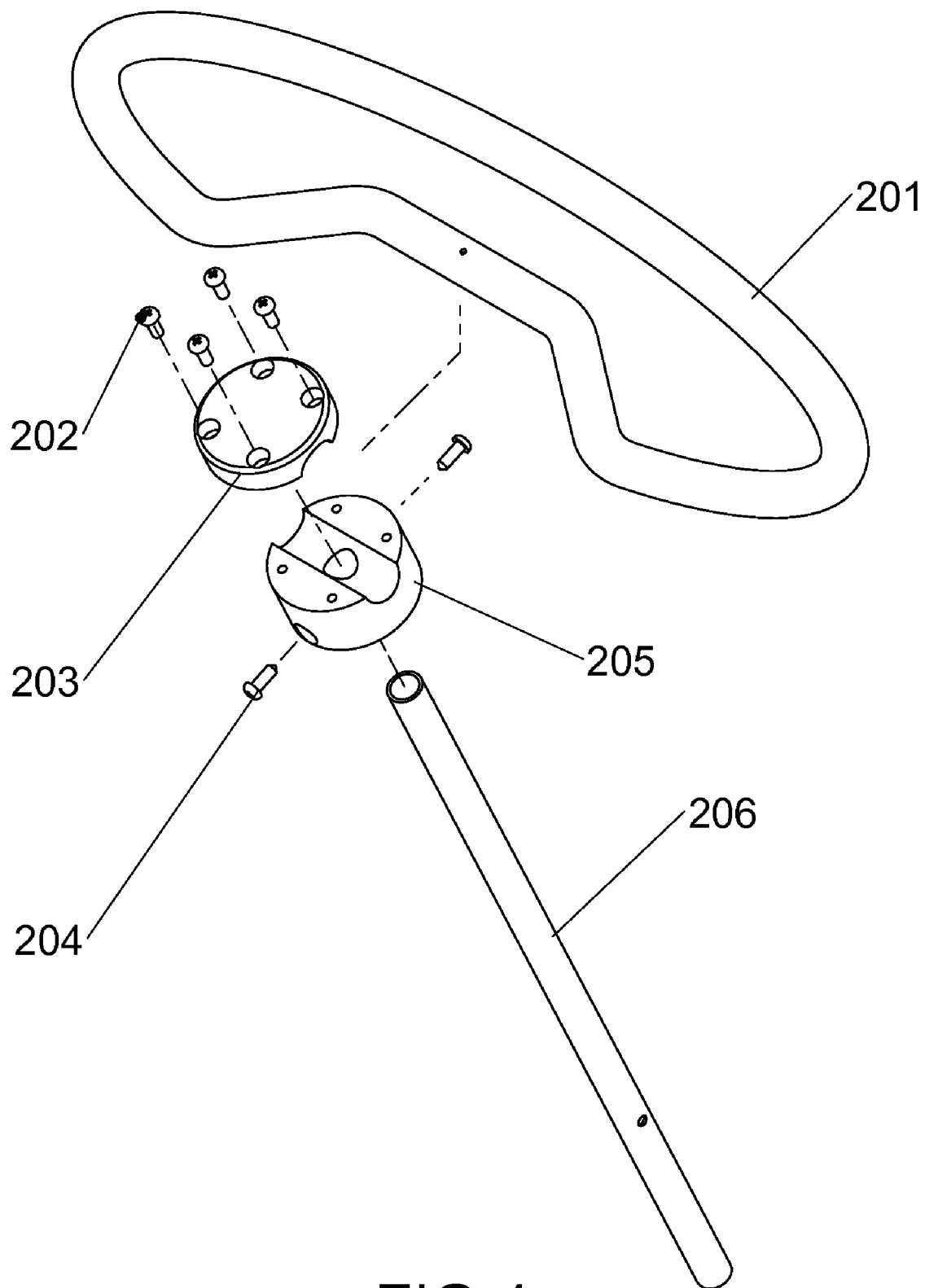
FIG. 4 is a detailed exploded view of the steering mechanism assembly.

FIG. 4 is a detailed exploded view of the steering mechanism assembly (200) of FIG. 2. A steering hand loop (201) rests between an upper steering block (203) and a lower steering block (205). Screws (202) hold the upper steering block (203) to the lower steering block (205). An upper torsion steering stick (206) is inserted in the lower steering block (205) and held in with screws (204).

Figure 5:
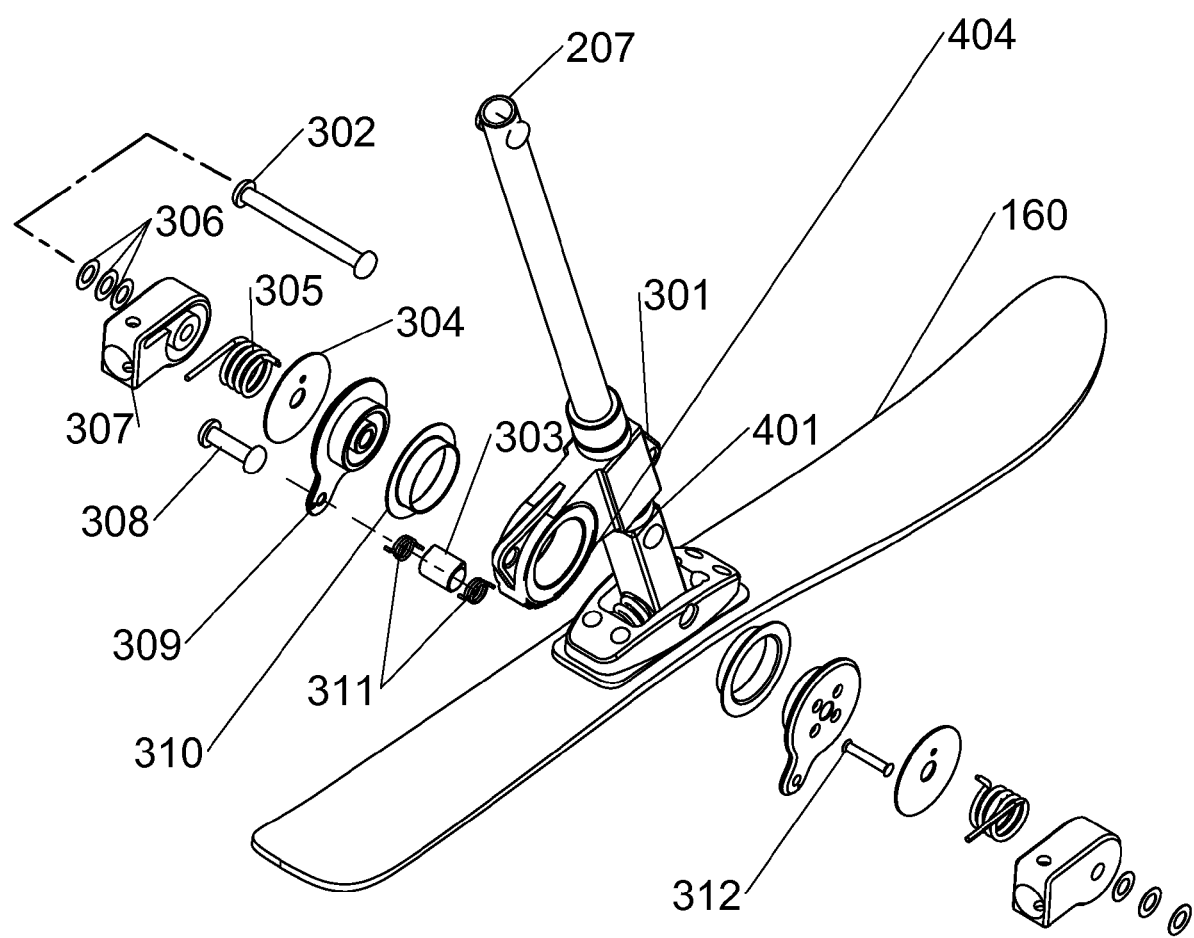
FIG. 5 is a detailed exploded view of the front ski, forward foot, control axial member, steering shaft.

FIG. 5 shows the lower portion of the steering mechanism assembly (200) of FIG. 2 and the control axial member (300)

of FIG. 2. A lower torsion steering shaft (207) has attached the control axial member (300) of FIG. 2. The control axial member (300) of FIG. 2 is shown in exploded view and is attached to the lower torsion steering shaft (207) with a forward axial control fitting (301). The forward axial control fitting (301) has the following items inserted in the following order on the left and right side, from the fitting outward: a bushing (310), a rod reset fitting (309), a washer (304), a spring a control axial housing (307), and three washers (306). These items are held together with a main pin (302). A snap cam (303) with a spring (311) on each side is held together with a pin (308) to the rod reset fitting (309) on the left and right side of the forward axial control fitting (301). A steering hinge fitting (401) is attached to the lower torsion steering shaft (207). A forward foot (404) is attached to the steering hinge fitting (401). A ski (160) is attached to the forward foot fitting (404).

FIG. 6 is a perspective view of the steering hinge fitting (400). It shows the knob (401x) feature of the steering hinge fitting.

FIG. 7 shows the lower portion of the steering mechanism assembly (200) of FIG. 2 and the control axial member (300) of FIG. 2. The lower torsion steering shaft (207) has a knob (207x). A steering bushing (313) rests against the lower torsion steering shaft fitting knob (207x) and inside of the forward axial control fitting (301). On the bottom side of the forward axial control fitting (301) is a steering bushing (314). This exploded view shows the control axial member of FIG. 2 with one control axial housing (307) removed, showing how the snap cam (303) rests between the two rod reset fittings (309). The steering hinge fitting (401) is attached to the lower torsion steering shaft with a pin (403). A compression spring (406) rests on the knob (401x) of the steering hinge fitting (401). The bottom of the steering hinge fitting (401) and the compression spring (406) rests in the forward foot (404) and is attached with a pin (405). The forward foot (404) is attached to the ski (160) with six screws (402).

Figure 8:
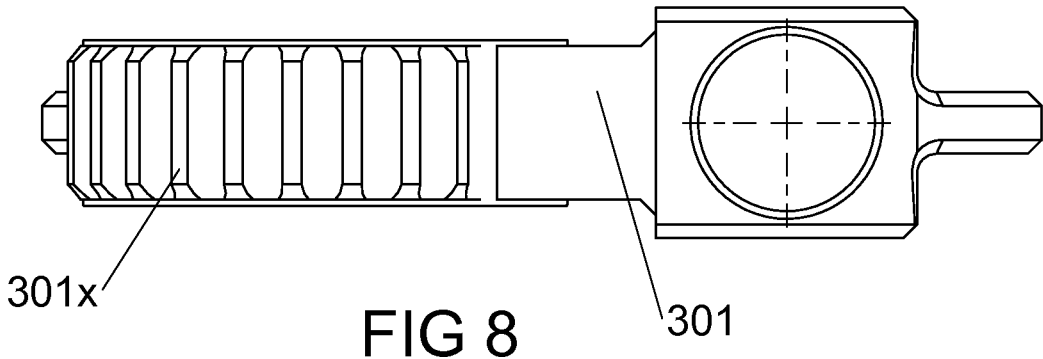
FIG. 8 is a bottom view of the forward axial control fitting.

FIG. 8 is a bottom view of the forward axial control fitting (301) showing the teeth (301x).

Figure 9:
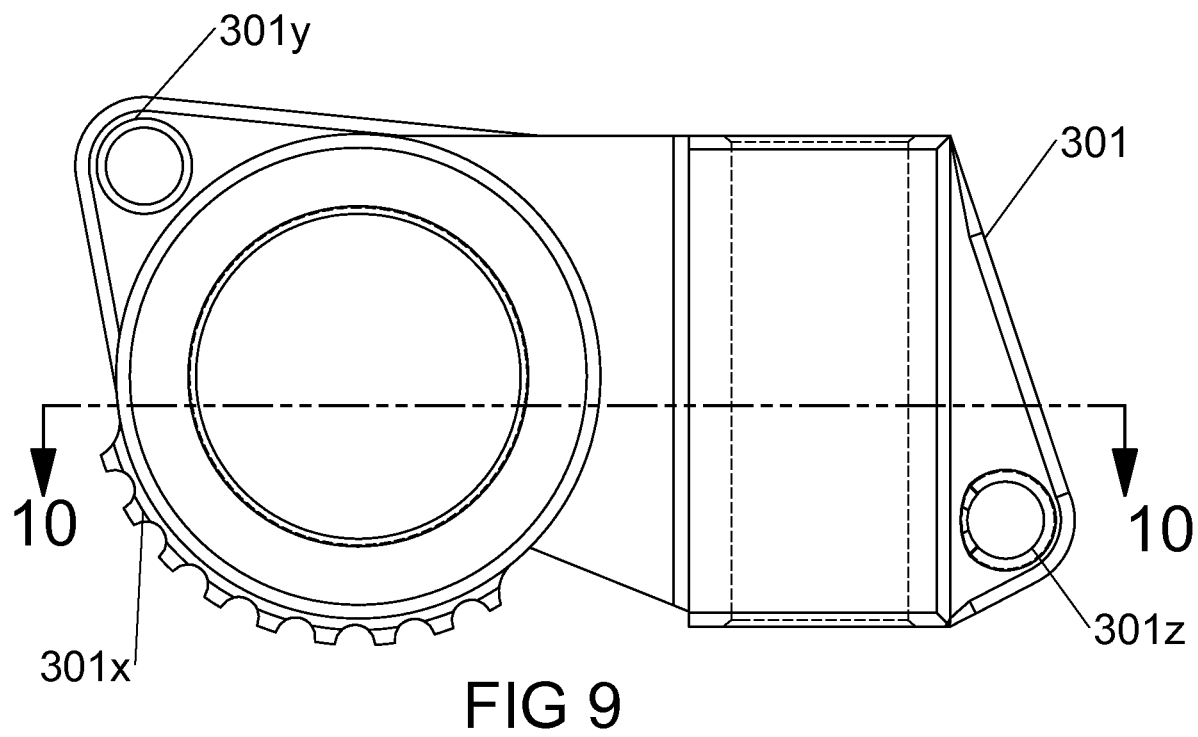
FIG. 9 is a side view of the forward axial control fitting.

FIG. 9 is a side view of the forward axial control fitting (301) showing the teeth (301x), aft attachment ring (301y) and forward attachment ring (301z).

Figure 10:
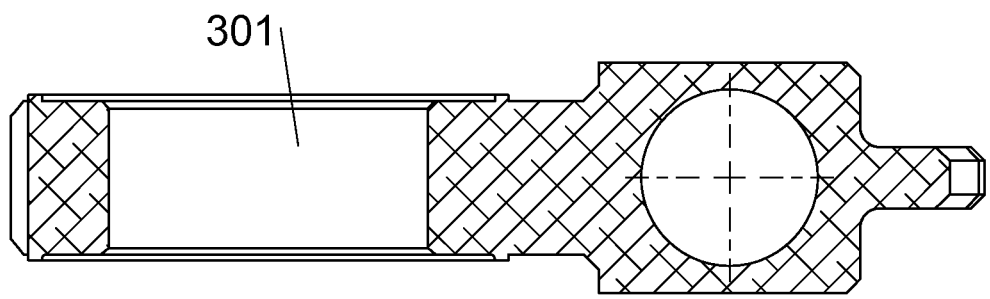
FIG. 10 is a cutaway view of the forward axial control fitting.

FIG. 10 is a cutaway view of the forward axial control fitting (301) showing the holes for the lower torsion steering shaft (207) of FIG. 5 and control axial member (300) of FIG. 2.

Figure 11:
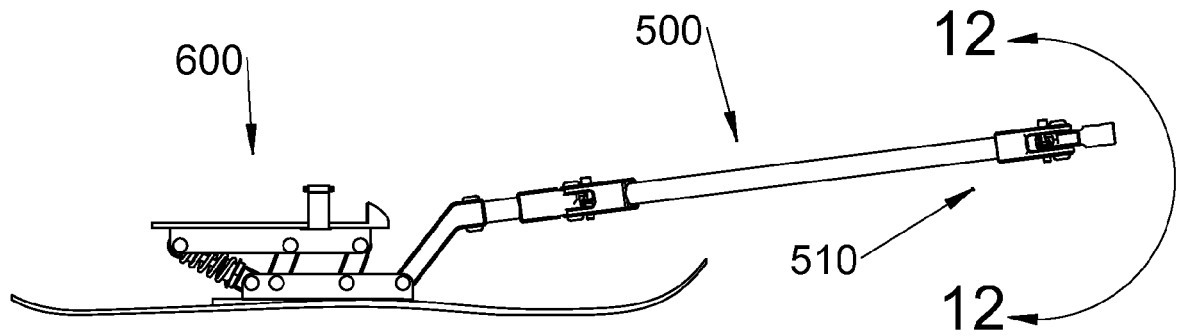
FIG. 11 is a side view of the level pedal spring assembly and torque control rod assembly.

FIG. 11 is a side view of the level pedal spring assembly (600), torque control rod assembly (500) and linking assembly (510).

Figure 12:
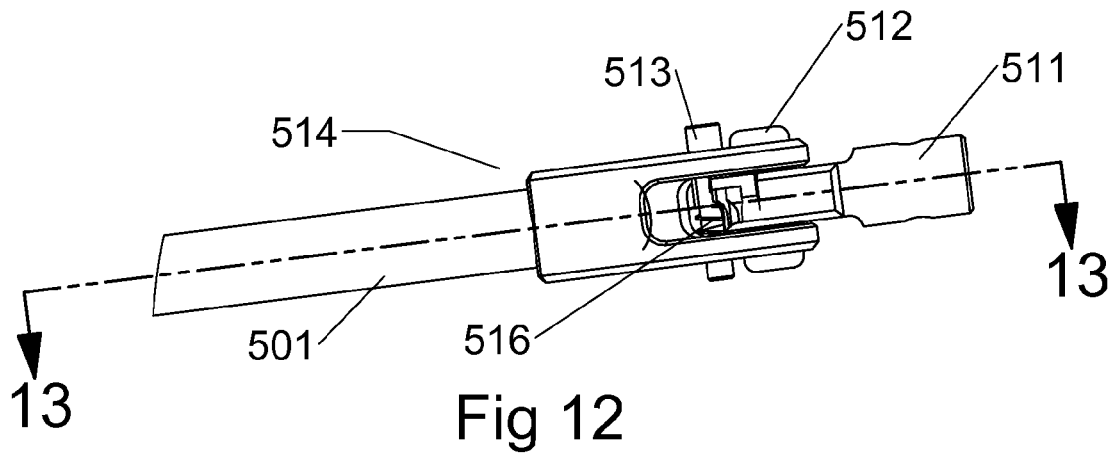
FIG. 12 is a detailed side view of the linking assembly.

FIG. 12 is a detailed side view of the linking assembly (510) of FIG. 3. A snap cam lockend (511) is attached to an aft torque lockend (514) with a snap cam pin (512). Resting inside of the aft torque lockend (514) is a lock pin (513) with a lock pin spring (516). The front torque rod (501) is shown attached to the aft torque lockend (514).

Figure 13:
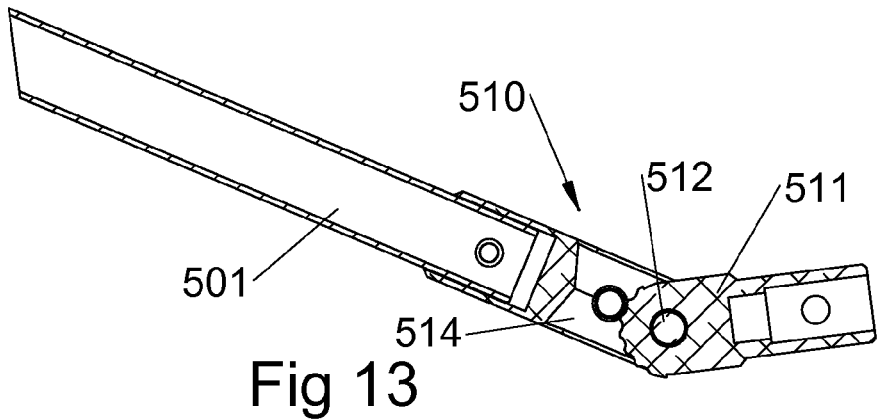
FIG. 13 is a cutaway view of the linking assembly.

FIG. 13 is a cutaway view of the linking assembly (510). The snap cam lockend (511) is shown attached to the aft torque lockend (514) with a snap cam pin (512). The snap cam lockend (511) is shown resting inside of the aft torque lockend (514).

Figure 14:
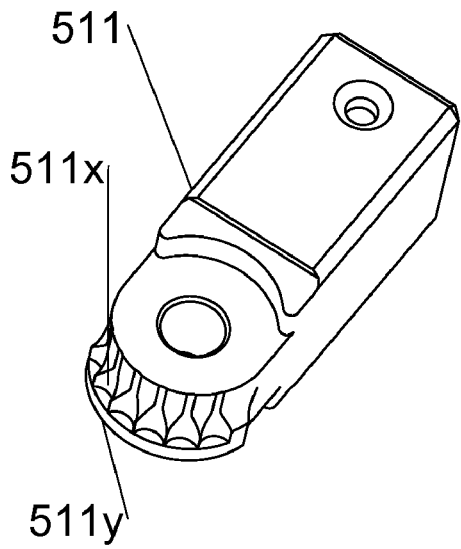
FIG. 14 is a perspective view of the forward torque lockend with key slot and key stop features.

FIG. 14 is a perspective view of the forward torque lockend (511) with key slot (511x) and key stop (511y) features.

Figure 15:
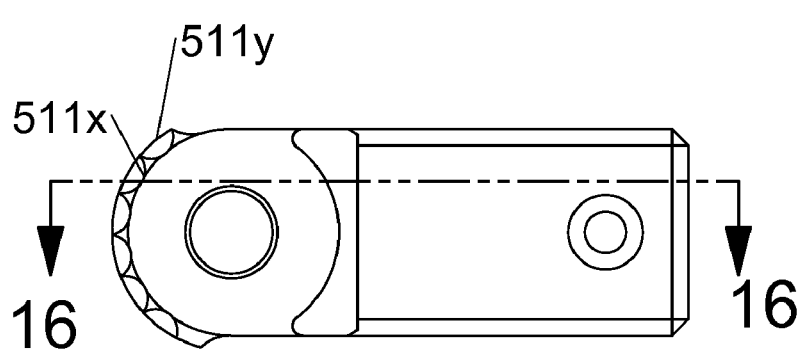
FIG. 15 is a side view of the forward torque lockend with key slot and key stop.

FIG. 15 is a side view of the forward torque lockend (511) with key slot (511x) and key stop (511y).

Figure 16:
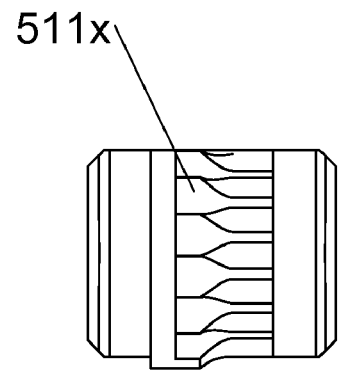
FIG. 16 is a front view of the forward torque lockend with key slot.

FIG. 16 is a front view of the forward torque lockend (511) with key slot (511x).

Figure 17:
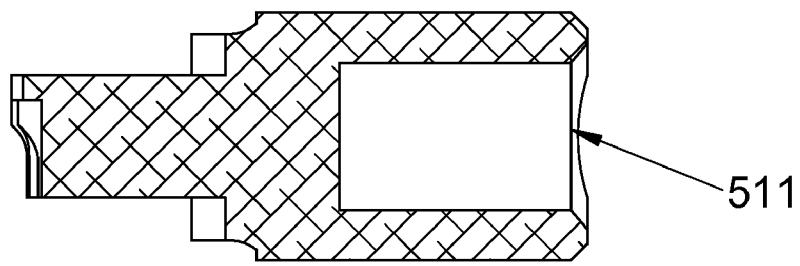
FIG. 17 is a cutaway view of the forward torque lockend.

FIG. 17 is a cutaway view of the forward torque lockend (511).

Figure 18:
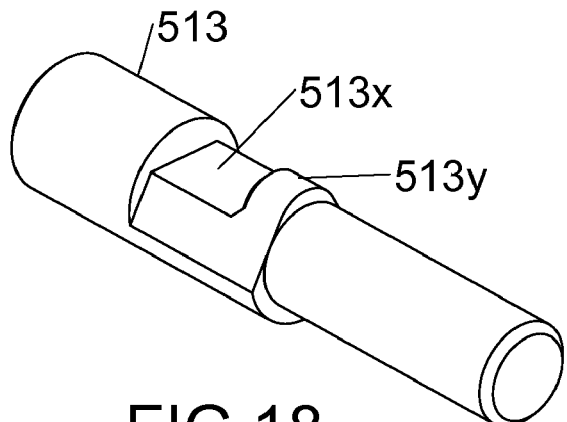
FIG. 18 is a perspective view of the lock pin with lock slot and lock tooth features.

FIG. 18 is a perspective view of the lock pin (513) with lock slot (513x) and lock tooth (513y) features.

Figure 19:
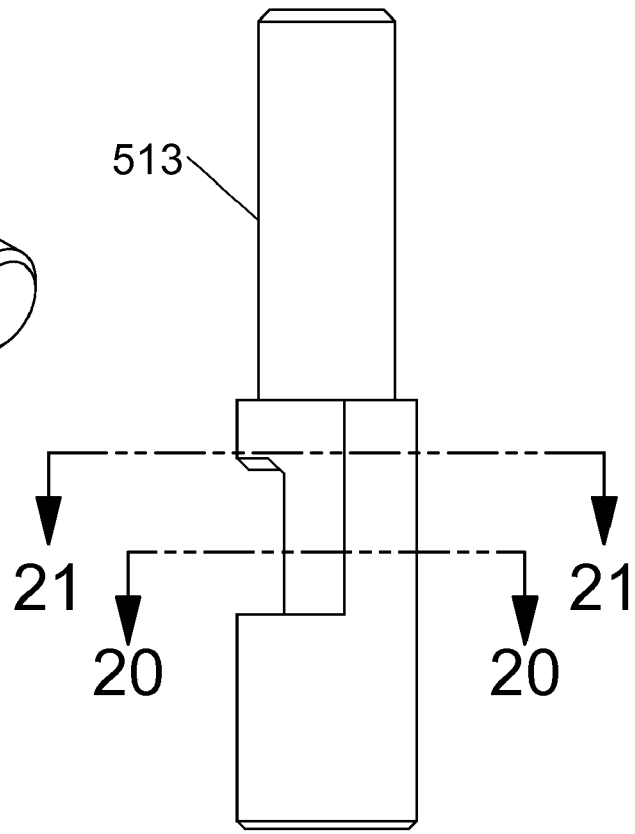
FIG. 19 is a side view of the lock pin with lock slot and lock tooth features.

FIG. 19 is a side view of the lock pin (513).

Figure 20:
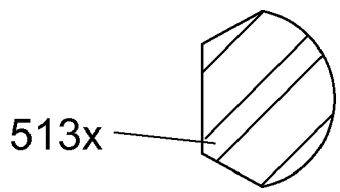
FIG. 20 is a cutaway view of the lock slot feature of the lock pin.

FIG. 20 is a cutaway view of the lock slot (513x) feature of the lock pin (513).

Figure 21:
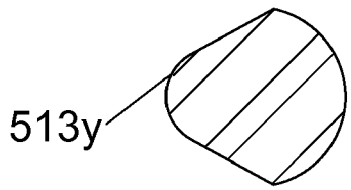
FIG. 21 is a cutaway view of the lock tooth feature of the lock pin.

FIG. 21 is a cutaway view of the lock tooth (513y) feature of the lock pin (513).

Figure 22:
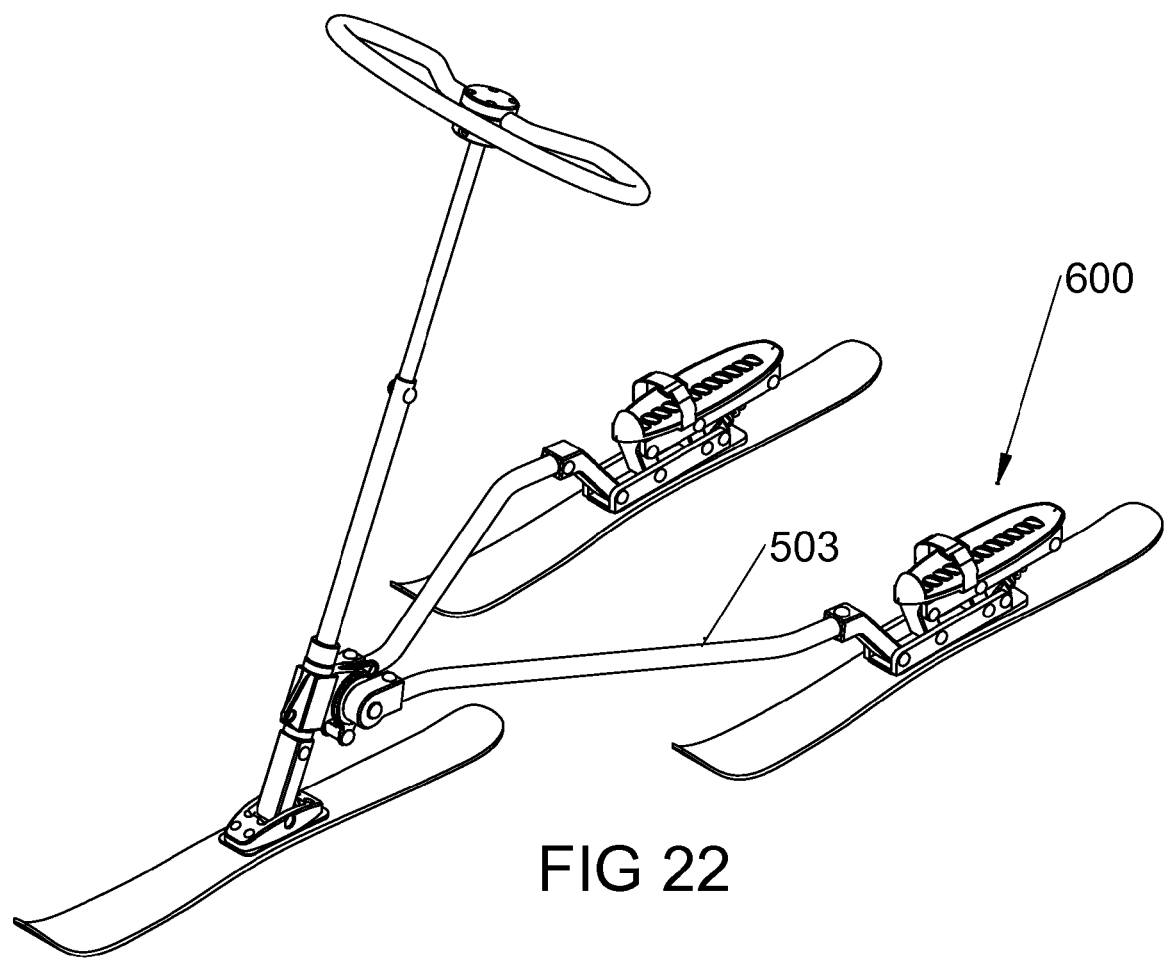
FIG. 22 is a perspective view of the Tri-Axial Control Device with non-adjustable control rods and skis.

FIG. 22 is a perspective view of the Tri-Axial Control Device with the level pedal spring assembly (600) and a torque rod (503).

Figure 23:
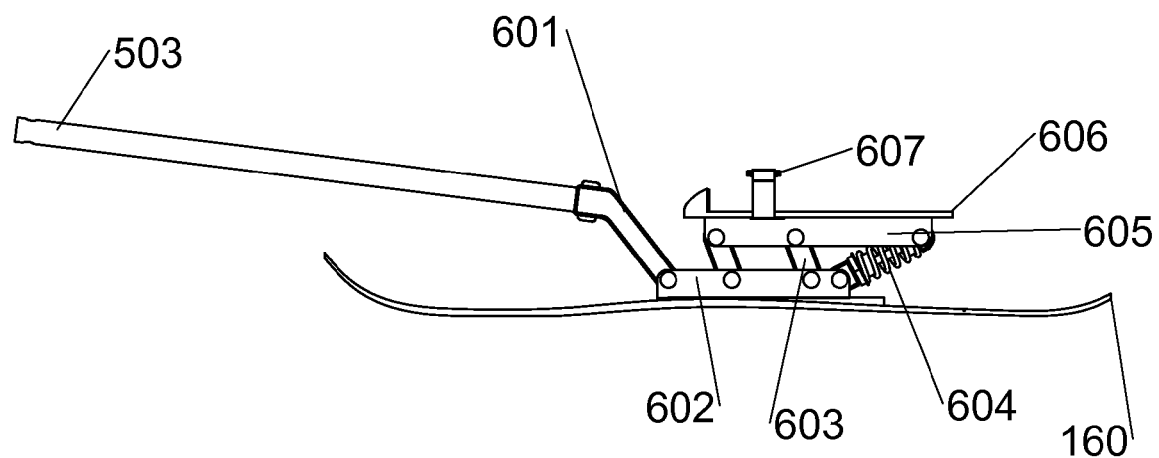
FIG. 23 is a detailed side view of the level pedal spring assembly and torque control rod assembly.

FIG. 23 shows a detailed side view of the level pedal spring assembly (600) and non-adjustable torque rod assembly. The torque rod (503) is attached to a torque fitting (601). The torque fitting (601) it attached to a bottom spring support (602). The bottom spring support (602) is attached to an upper spring support (605) by two pedal links (603) that rest inside of the bottom spring support (602) and upper spring support (605). A compression pedal spring (604) is attached to the rear of the bottom spring support (602) and upper spring support (605). A pedal base (606) is attached to the upper spring support (605). A pedal strap (607) rests between the upper spring support (605) and the pedal base (606). A ski (160) is attached to the underside of the bottom spring support (602).

Figure 24:
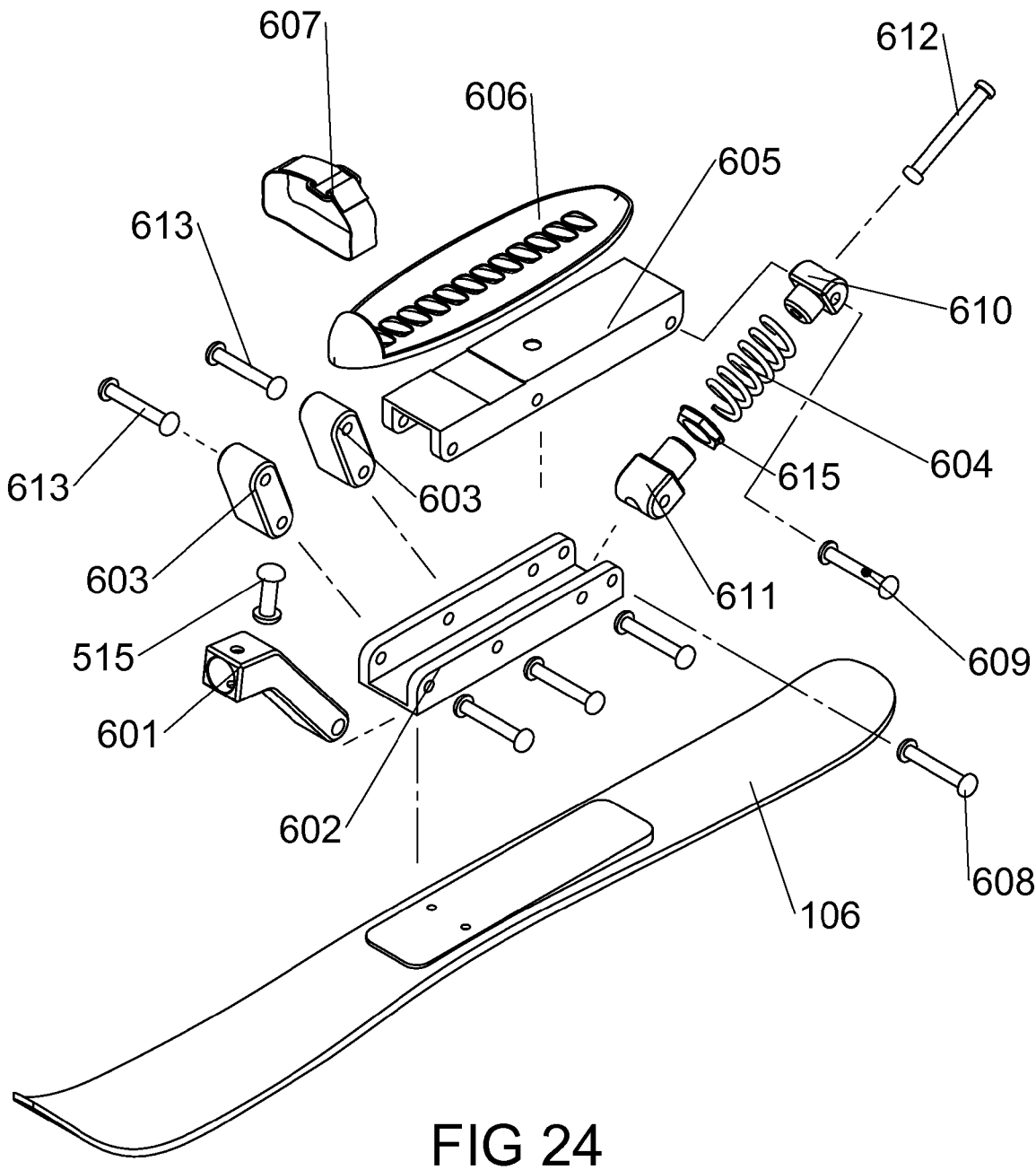
FIG. 24 is a detailed exploded view of the level pedal spring assembly.

FIG. 24 is a detailed exploded view of the level pedal spring assembly (600) of FIG. 2. Attached to the top of the ski (160) is the bottom spring support (602). The torque fitting (601) rests in the front of the bottom spring support (602). The links (603) rest inside of the bottom spring support (602). An adjustable spring fitting (611) rests inside the bottom spring support (602). The torque fitting (601), the links (603), and the adjustable spring fitting (611) are attached with pins (608). A pin (614) is used to attaché the torque rod (503) of FIG. 22 to the torque fitting (601). A nut (615) and the compression pedal spring (604) rest between the adjustable spring fitting (611) and a spring fitting (610) and are held together with a pin (612). The upper spring support (605) attaches to the links (603) with pins (613). The upper spring support is attached to the spring support with a pin (609). The pedal base (606) is attached to the upper spring support (605). The pedal strap (607) rests between the pedal base (606) and the upper spring support (605).

Figure 25:
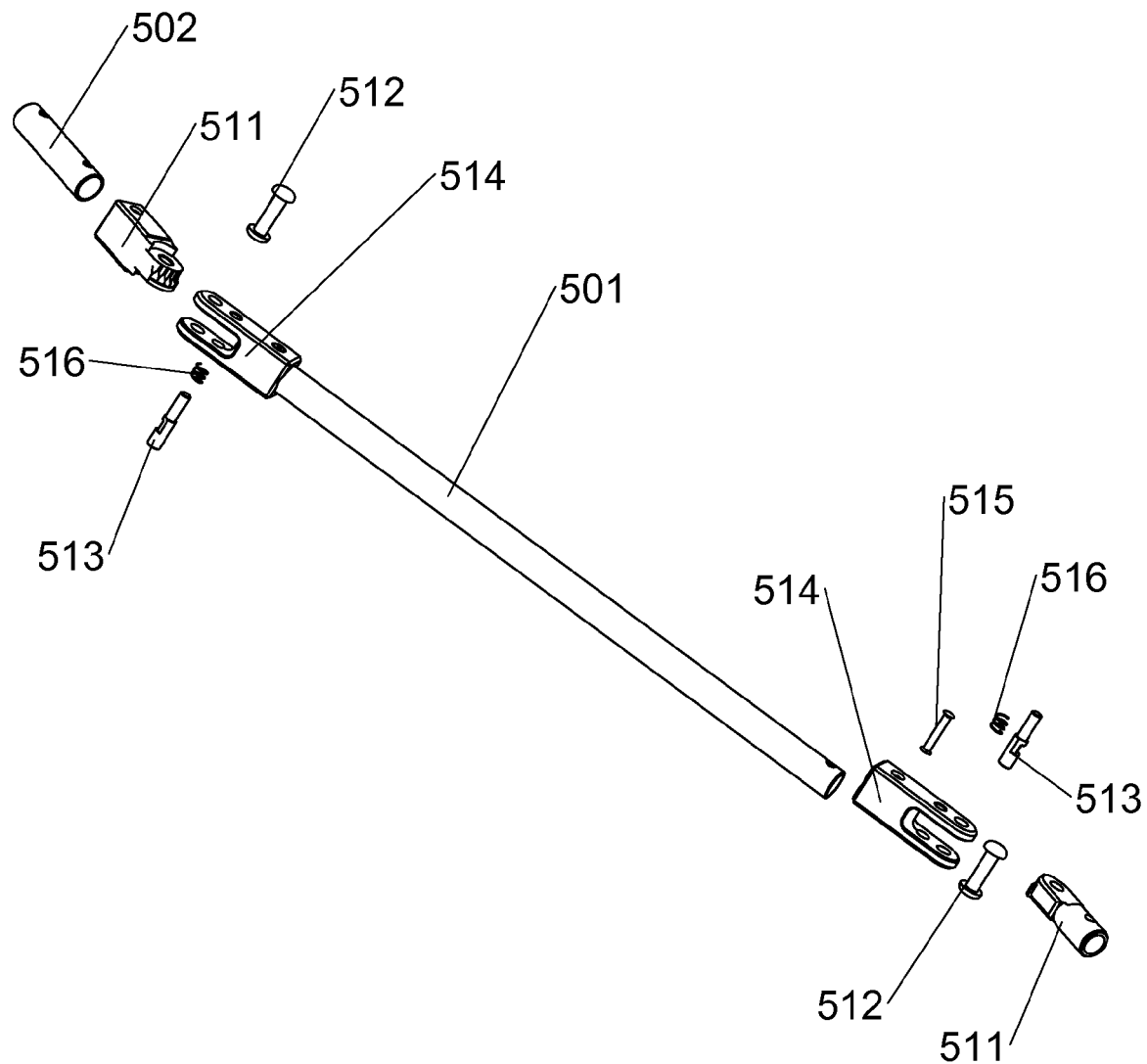
FIG. 25 is a detailed exploded view of the torque control rod assembly.

FIG. 25 is a detailed exploded view of the torque control rod assembly (500) of FIG. 2 and linking assembly (510) of FIG. 3. The forward torque lockend (511) is attached to the aft torque lockend (514) with the snap cam pin (512). The lock pin spring (516) rests on the center pin (513), which rest inside of the aft torque lockend (514). A pin (515) holds the aft torque lockend (514) to the front torque rod (501) and the rear torque rod (502).

Figure 26:
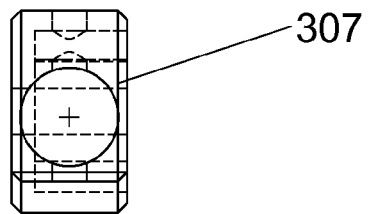
FIG. 26 is a rear view of the axial control housing.

FIG. 26 is a rear view of the axial control housing (307).

Figure 27:
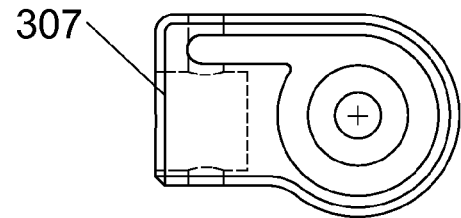
FIG. 27 is a transparent side view of the axial control housing.

FIG. 27 is a transparent side view of the axial control housing (307).

Figure 28:
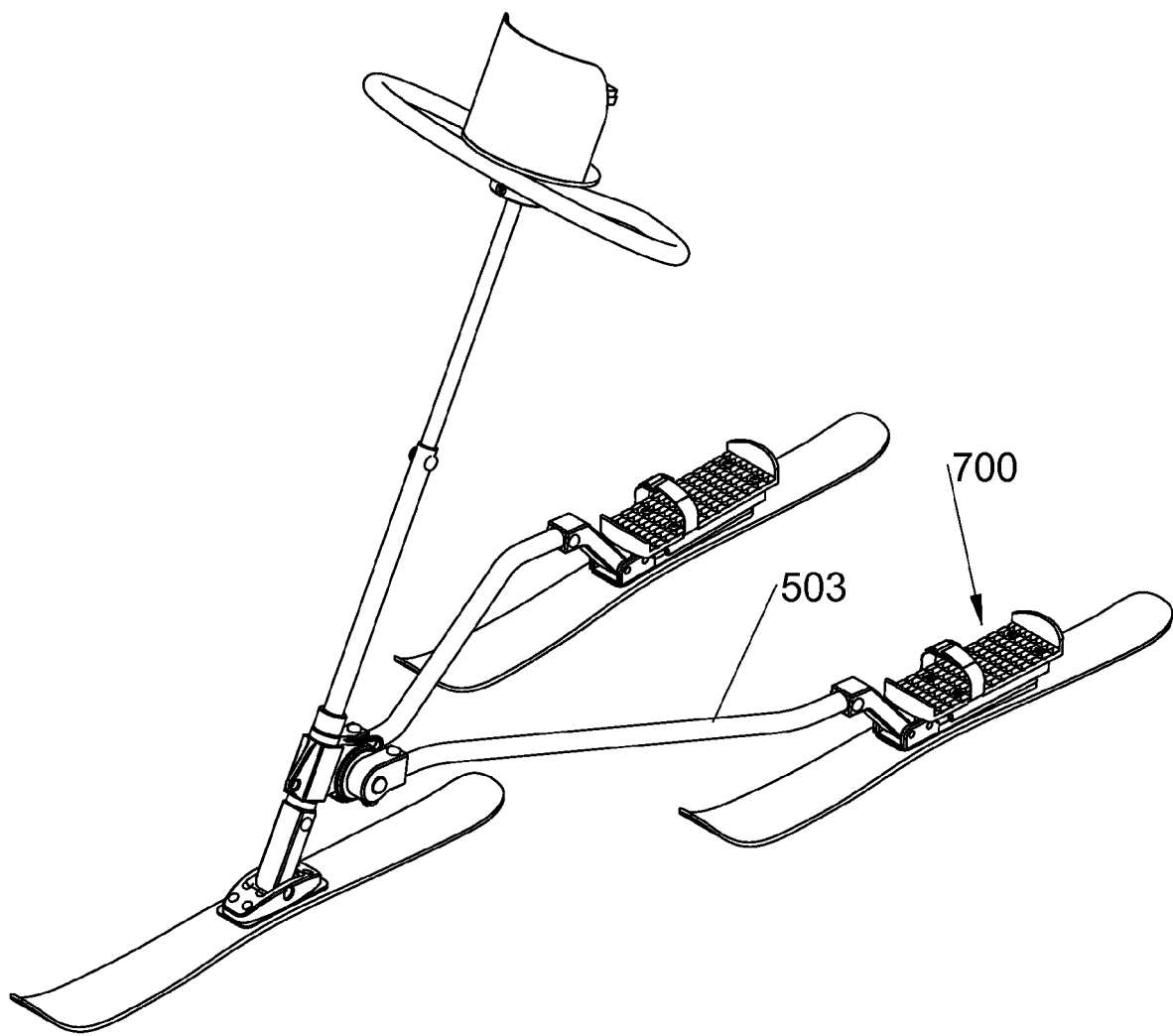
FIG. 28 is a detailed perspective view of the Tri-Axial Control Device with non-adjustable control rods and angular spring pedal assembly.

FIG. 28 is a detailed perspective view of the Tri-Axial Control with torque rod (503) and an angular spring pedal assembly (700).

Figure 29:
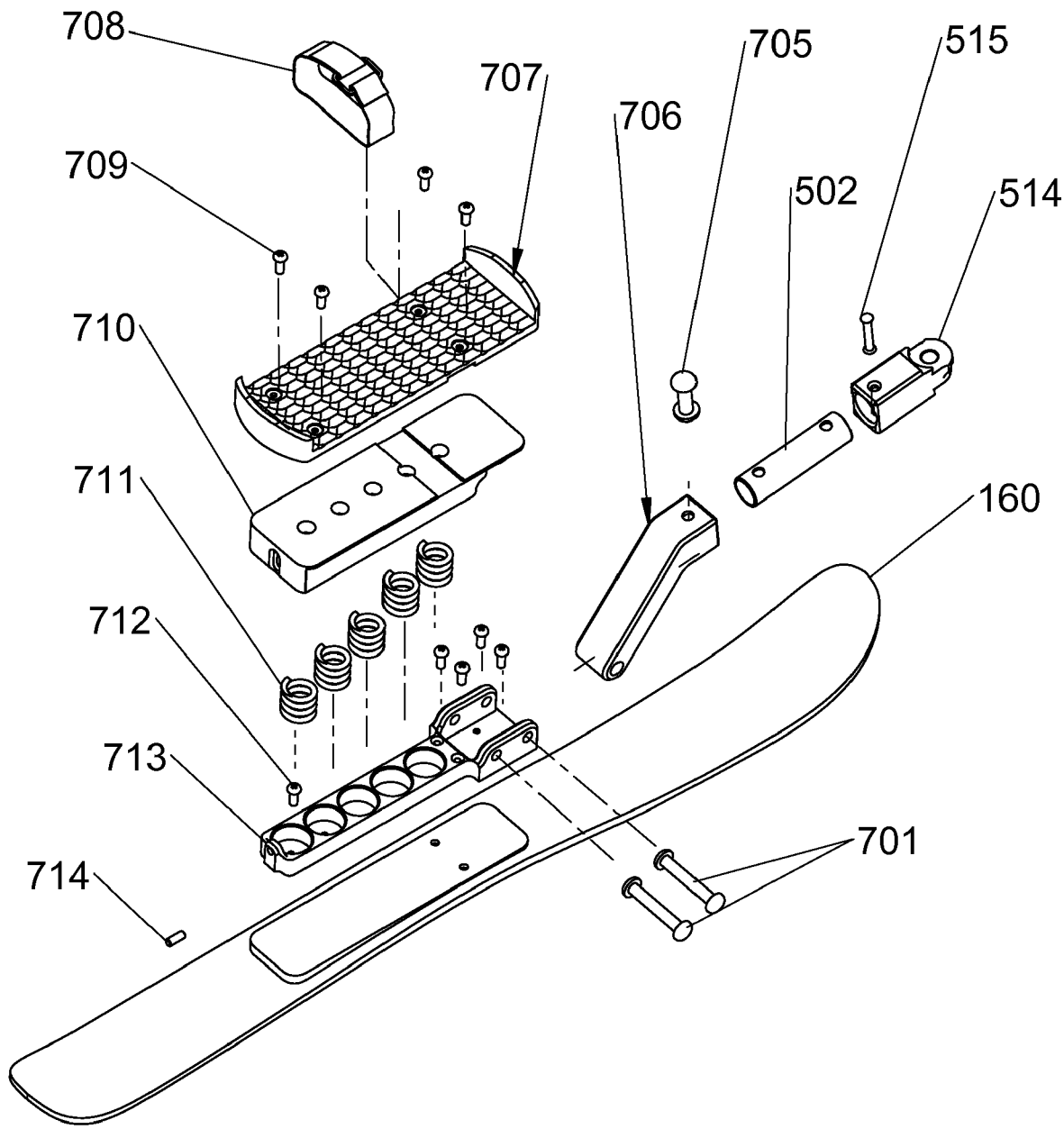
FIG. 29 is a detailed exploded view of the angular spring pedal assembly.

FIG. 29 is a detailed exploded view of the angular spring pedal assembly (700) of FIG. 28. The ski (160) is attached with screws (712) to the underside of a pedal support fitting (713). Compression springs (711) rest inside of the pedal support fitting. An upper pedal support (710) is attached to the pedal support fitting (713) with a pedal pin (714). A pedal plate (707) is attached to the upper pedal support (710) with screws (709). A pedal strap (708) rests between the upper pedal support (710) and the pedal plate (707). A torque fitting rests inside of the pedal support fitting and is attached with a pin (701). A pin (705) attaches the rear torque rod (502) to a torque fitting (706). The pin (515) of FIG. 25 attaches the aft torque lockend (514) of FIG. 12.

Figure 30:
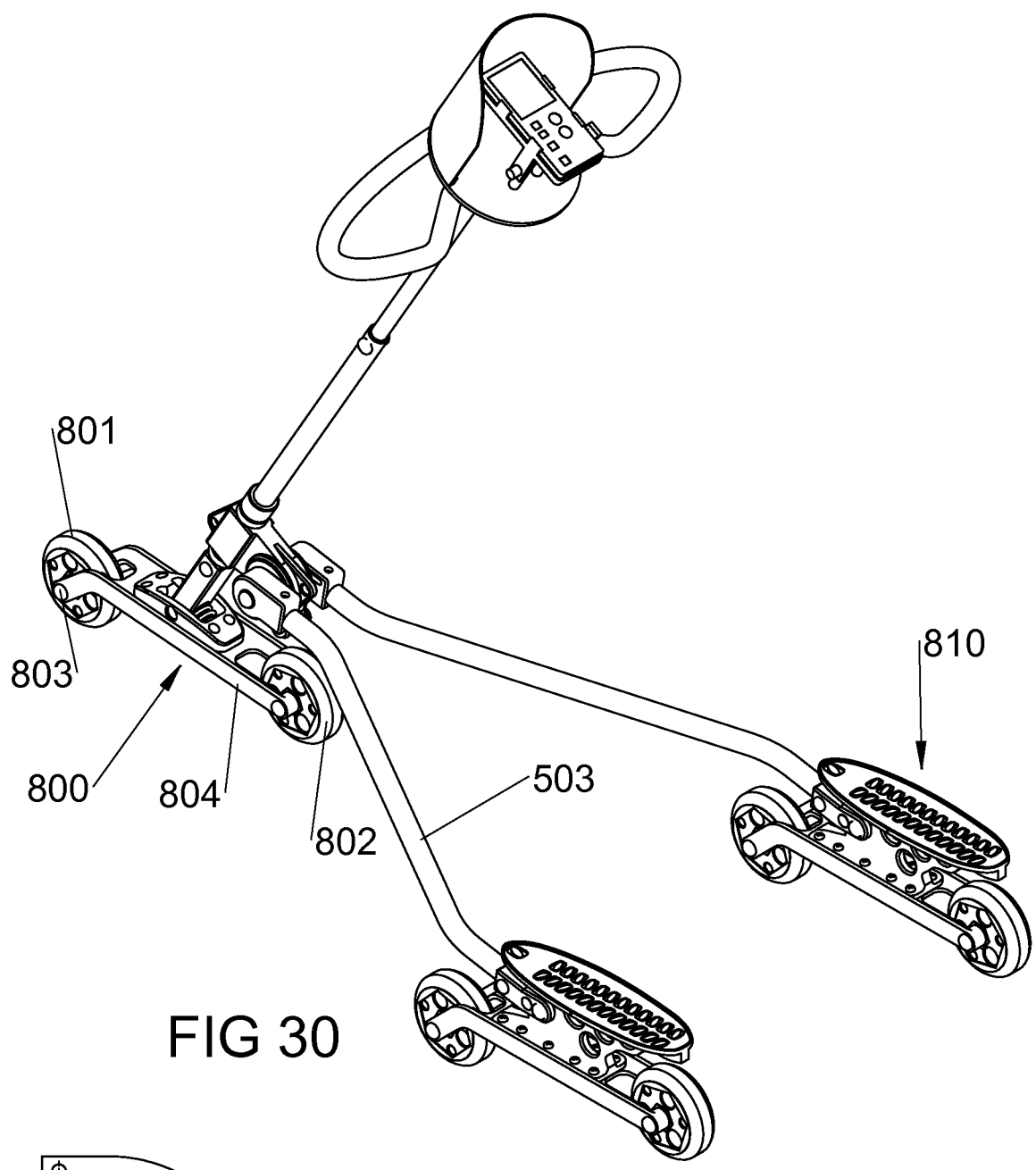
FIG. 30 is a detailed perspective view of the Tri-Axial Control Device with non-adjustable control rods and wheel assembly.

FIG. 30 is a detailed perspective view of the Tri-Axial Control Device with torque rod (503) of FIG. 22, wheel assembly (800), and a rear wheel assembly (810). A forward wheel (801) and a rear wheel (802) are attached to a front wheelbase (804). The front wheelbase (804) is attached to the forward foot (404) of FIG. 5.

Figure 31:
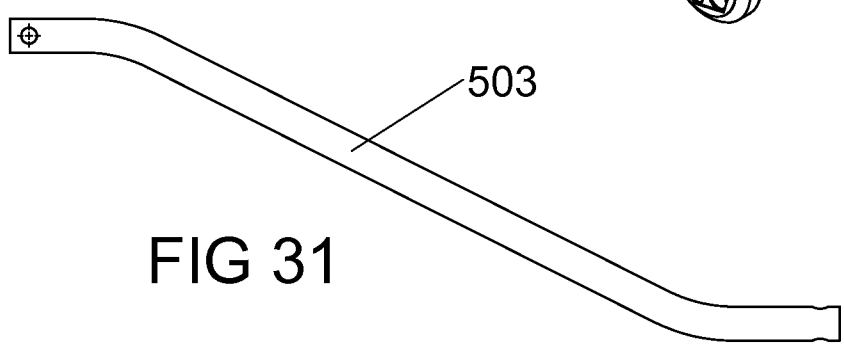
FIG. 31 is a side view of the torque rod.

FIG. 31 is a side view of the torque rod (503).

Figure 32:
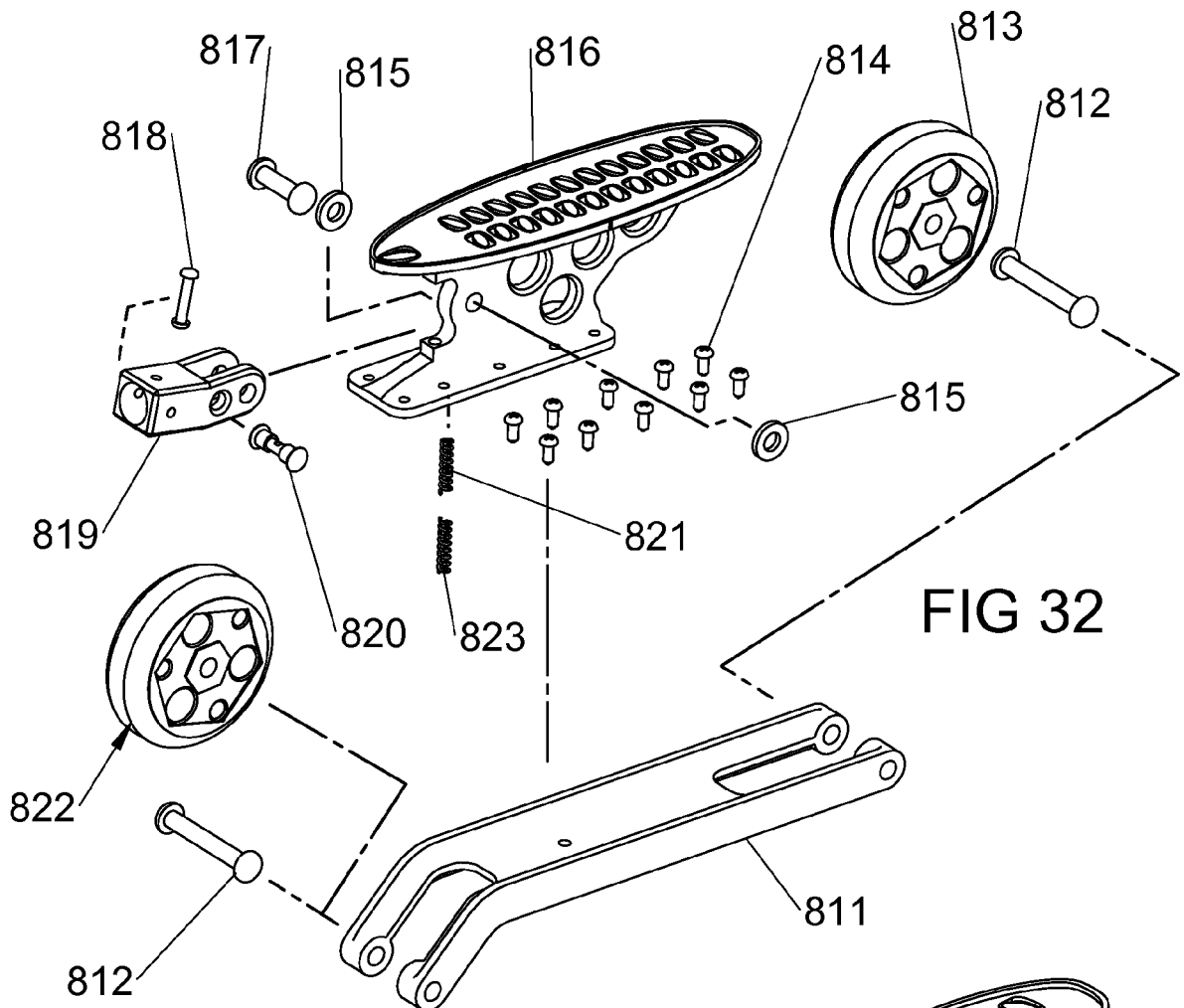
FIG. 32 is a detailed exploded view of the rear wheel assembly.

FIG. 32 is a detailed exploded view of the rear wheel assembly (810) of FIG. 30. A front wheel (822) and a rear wheel (813) are attached to a rear wheelbase (811) with pins (812). A wheel footpad (816) is attached to the rear wheelbase (811) with screws (814). The torque fitting (819) is attached to the wheel footpad (816) with a pin (817) and two washers (81.5). A center pin (820) rests inside of the torque fitting (819). A center pin spring (821) rests on the center pin (820). The center pin spring (821) rests in a wheel base upper cavity (816x) and the topside of the center pin (820). A center pin spring (823) rests on the underside of the center pin (820) and a wheel base lower cavity (816y). A pin (818) holds the torque rod (503) of FIG. 22 to the torque fitting (819).

Figure 33:
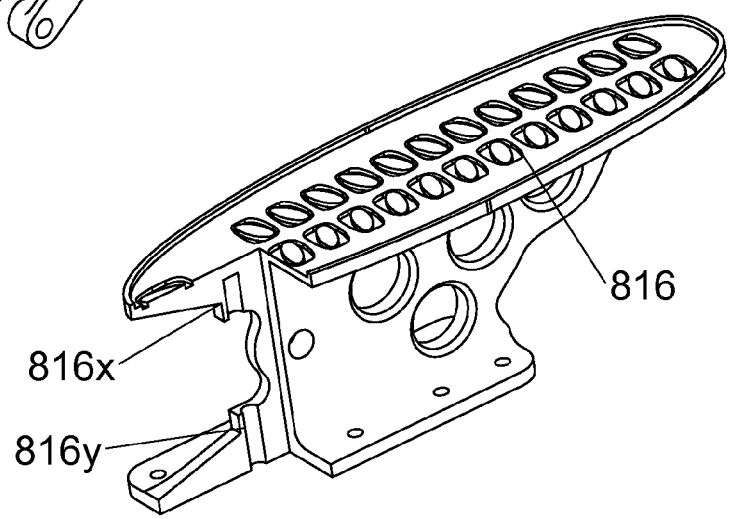
FIG. 33 is a cutaway view of the wheel base cavities in the wheelbase.

FIG. 33 is a cutaway view of the wheel base upper cavity (816x) and the wheel base lower cavity (816y) of the wheel footpad (816).

Figure 34:
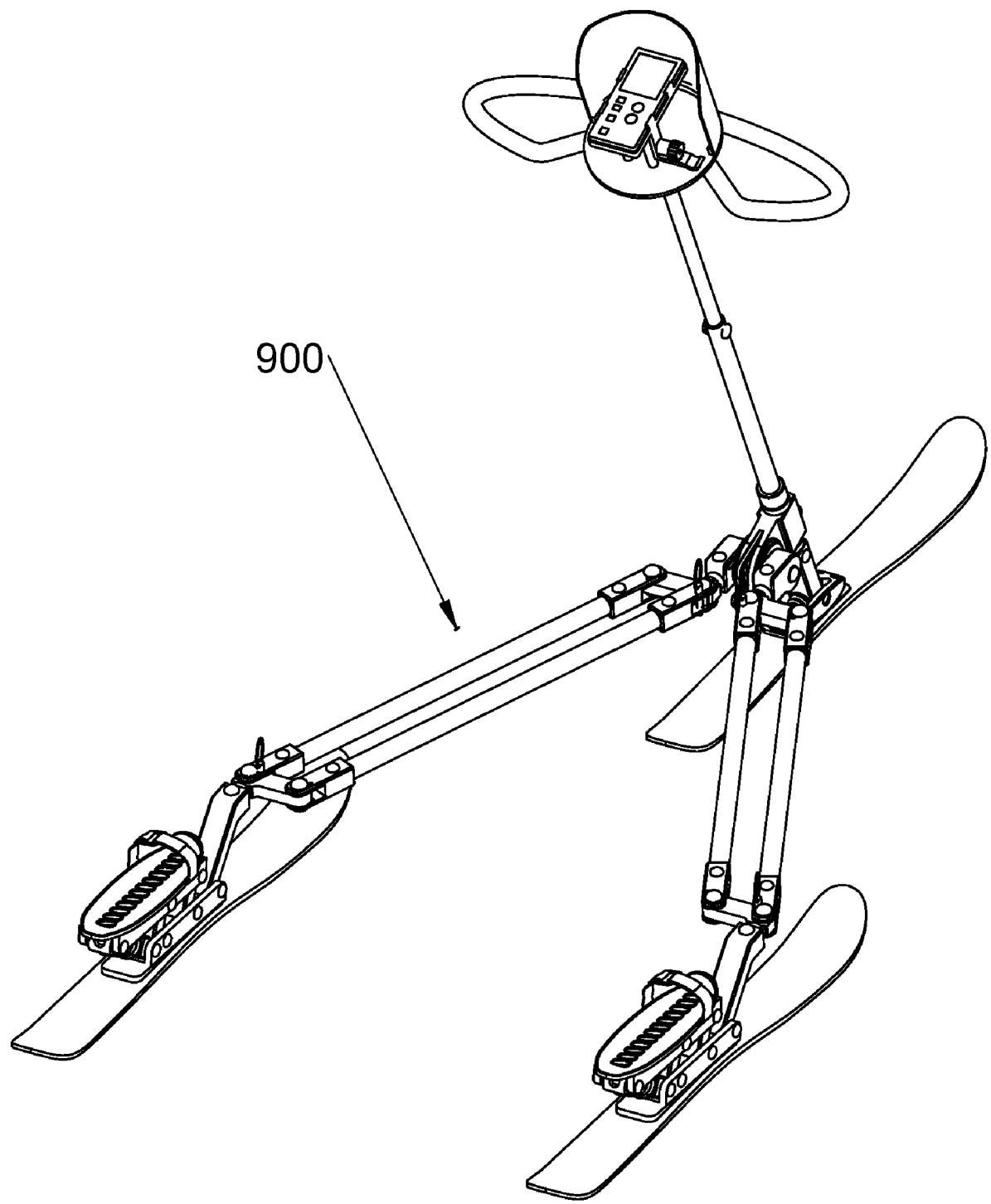
FIG. 34 is a perspective view of the Tri-Axial Control Device with free ride torque control rod assemblies.

FIG. 34 is a perspective view of the Tri-Axial Control Device with free ride torque control rod assemblies (900).

Figure 35:
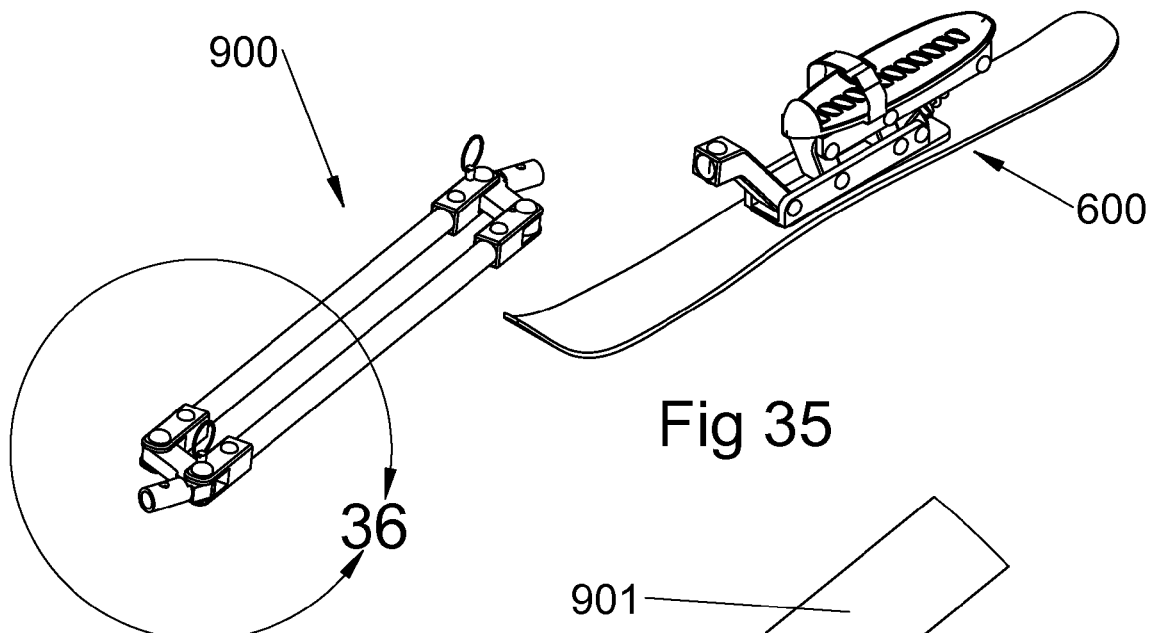
FIG. 35 is an exploded view of the free ride torque control rod assembly.

FIG. 35 is an exploded view of the free ride torque control rod assembly (900) and the level pedal spring assembly (600).

Figure 36:
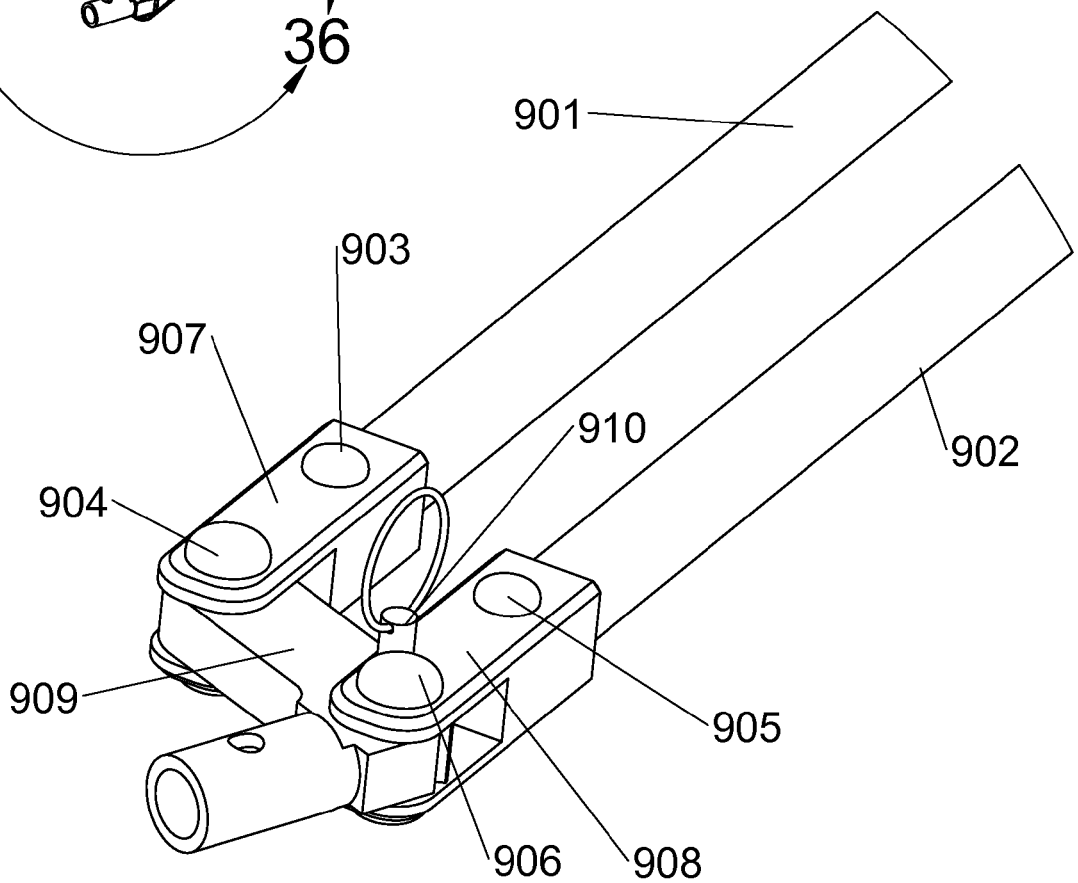
FIG. 36 is a cutaway view of the free ride torque fitting assembly.

FIG. 36 is a cutaway view of the free ride torque fitting assembly (900). An outside torque rod (901) is attached to a lockend (907) with a pin (903). An inside torque rod (902) is attached to a lockend (908) with a pin (905). An adjustment fitting (909) is attached to the lockend (907) with a pin (904) and the other lockend (908) with a pin (906).

Figure 37:
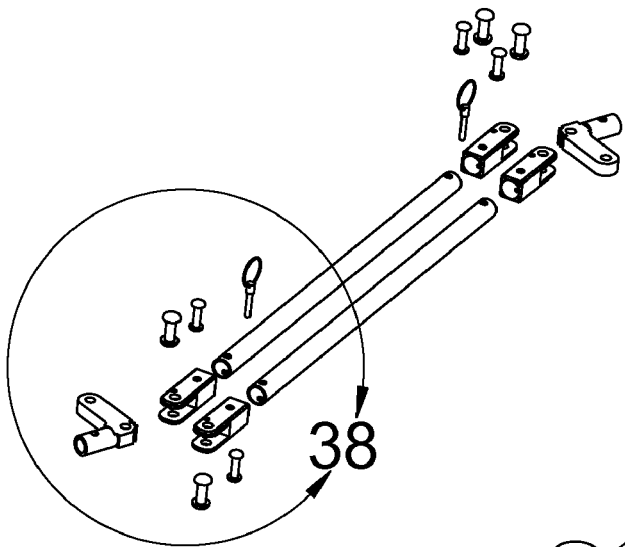
FIG. 37 is an exploded view of the free ride torque fitting assembly.

FIG. 37 is an exploded view of the free ride torque fitting assembly (900).

Figure 38:
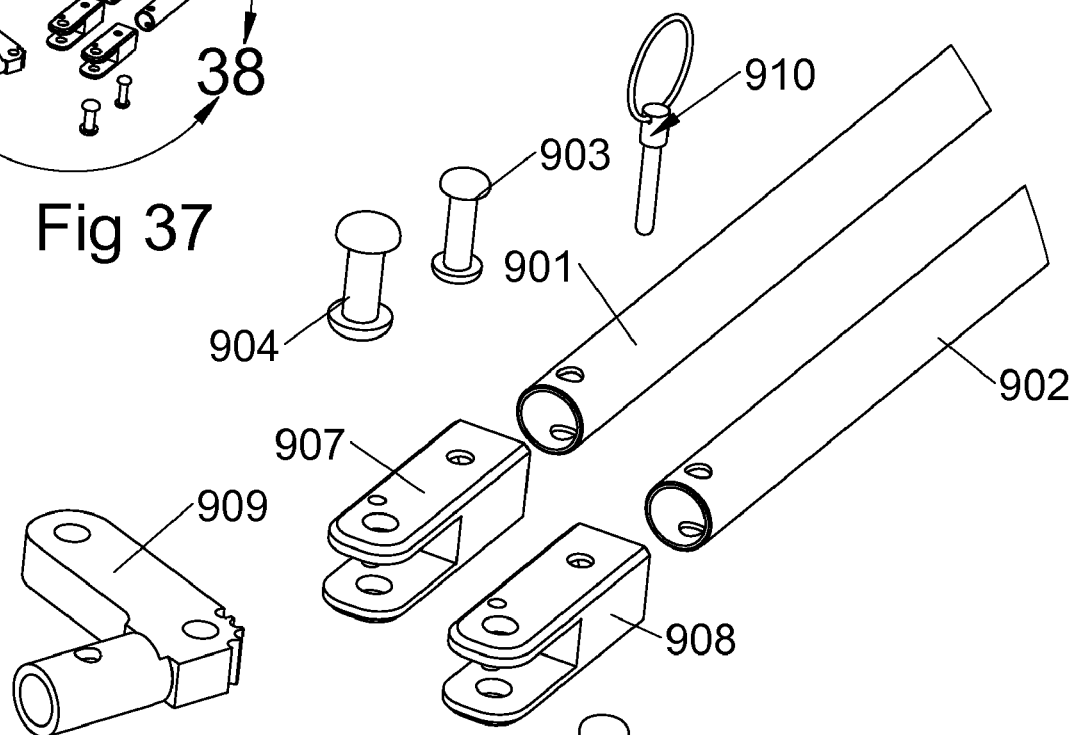
FIG. 38 is a cutaway exploded view of the free ride torque fitting assembly.

FIG. 38 is a cutaway exploded view of the free ride torque fitting assembly (900). An outside torque rod (901) is attached to a lockend (907) with a pin (903). An inside torque rod (902) is attached to a lockend (908) with a pin (905). An adjustment fitting (909) is attached to the lockend (907) with a pin (904) and the other lockend (908) with a pin (906).

Figure 39:
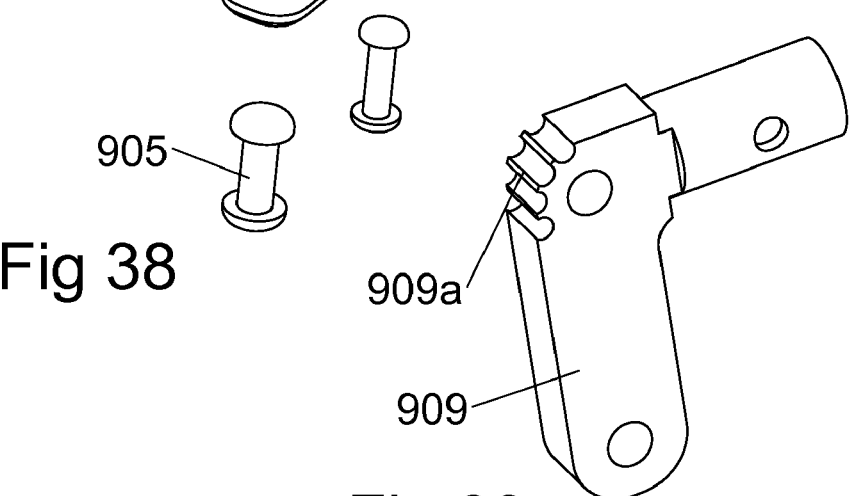
FIG. 39 is a perspective view of the free ride torque adjustment fitting.

FIG. 39 is a perspective view of the free ride torque adjustment fitting (909) with lock stops detailed (909x).

Figure 40:
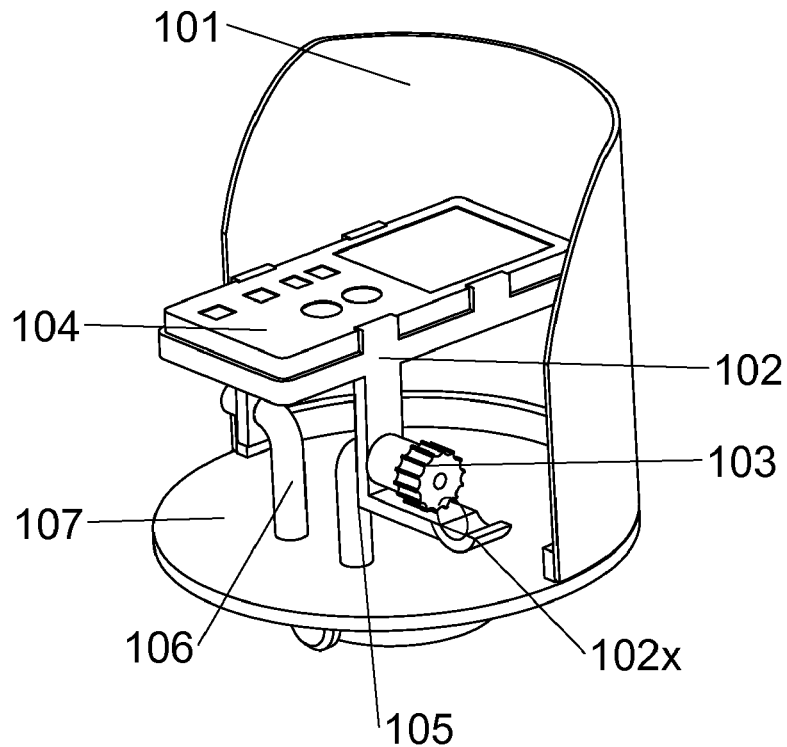
FIG. 40 is a perspective view of the mounting device for portable electronics.

FIG. 40 is a perspective view of the mounting device for portable electronics (100) of FIG. 2. A shield (101) is attached to a base (107). Two holder-arms (105) and (106) hold a device holder (102) onto the base (107). There is a clicker arm (102x) on one side of the device holder (102). A clicker stop (103) rests on the end of the holder-arm (105). The device holder (102) is shown with a device (104).

Figure 41:
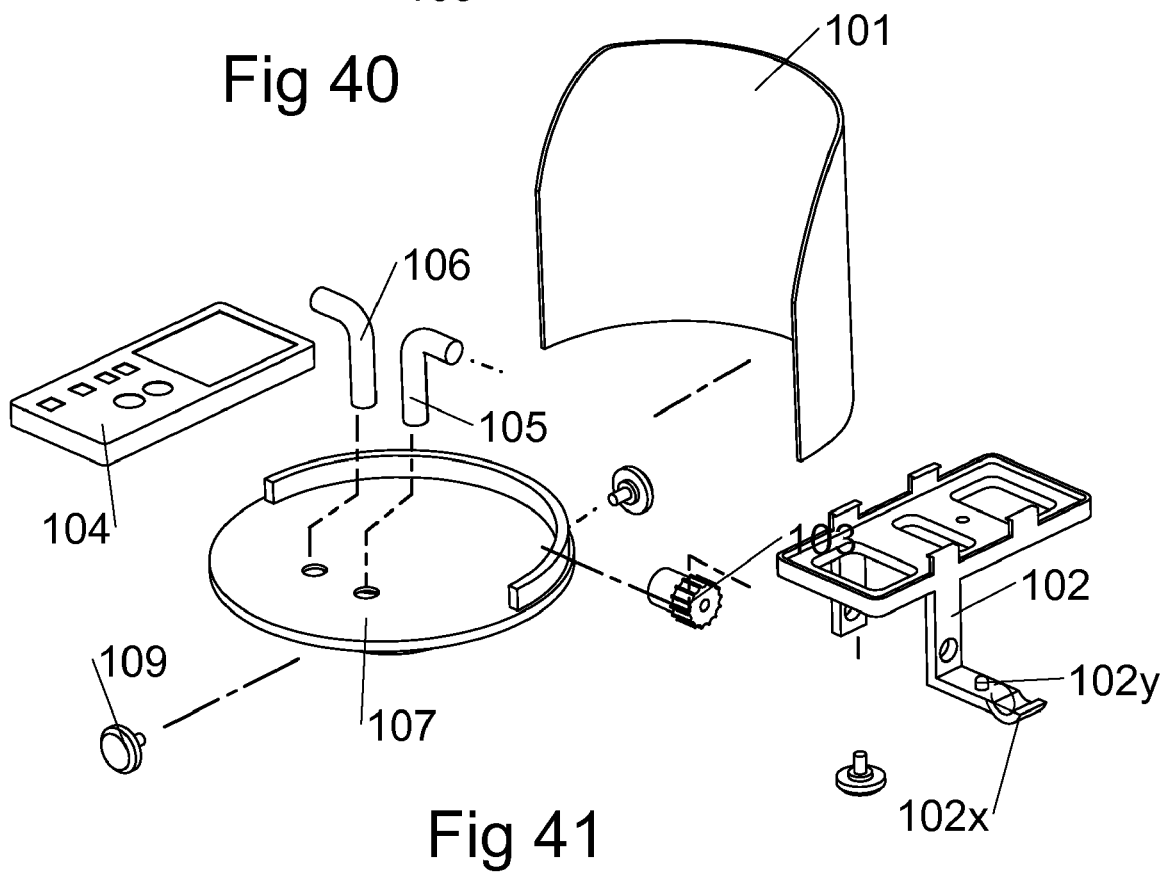
FIG. 41 is an exploded view of the mounting device for portable electronics.

FIG. 41 is an exploded view of the mounting device for portable electronics (100) of FIG. 2. A shield (101) is attached to a base (107). Two holder-arms (105) and (106) hold a device holder (102) onto the base (107). There is a clicker arm (102x) on one side of the device holder (102). There is a clicker stop (102y) on the clicker arm (102x). A clicker stop (103) rests on the end of the holder-arm (105). The device holder (102) is shown with a device (104). The base (107) has a bolt (109) that attaches the base to the upper steering block (203) of FIG. 4.

Figure 42:
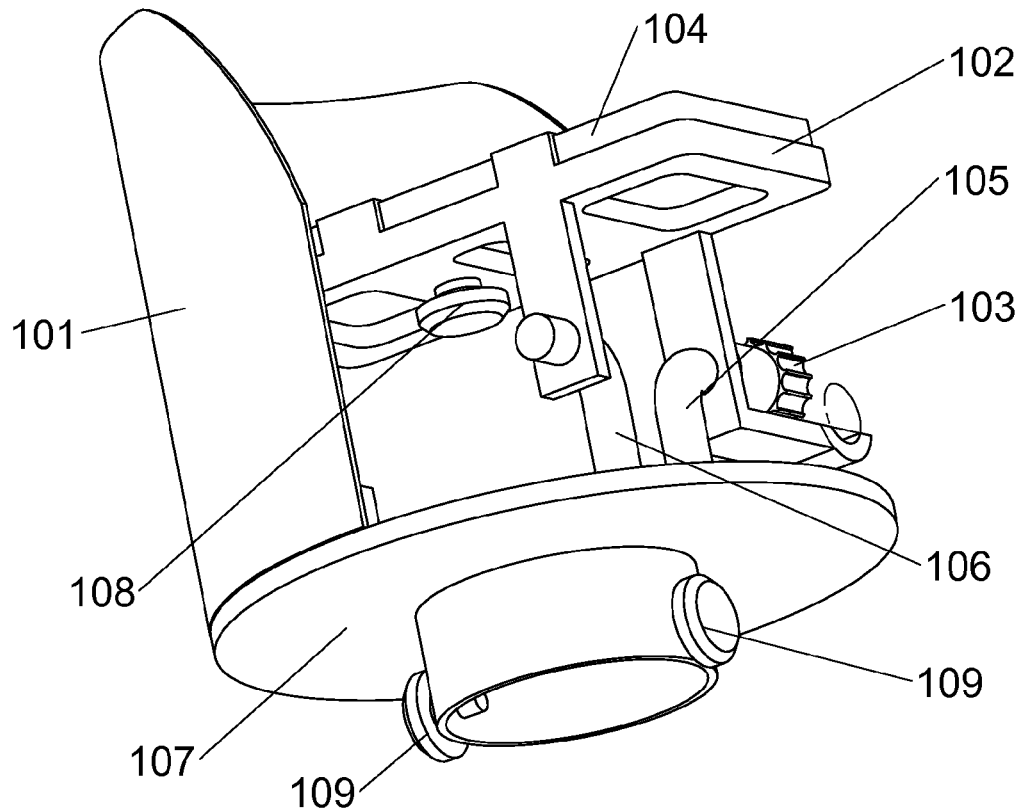
FIG. 42 is a perspective view of the mounting device for portable electronics.

FIG. 42 is a perspective view of the mounting device for portable electronics (100) of FIG. 2. A shield (101) is attached to a base (107). Two holder-arms (105) and (106) hold the device holder (102) onto the base (107). A bolt (108) is used to attach a device (104) to the device holder (102). A clicker stop (103) rests on the end of the holder-arm (105). The base (107) has two bolts (109) that attach the base to the upper steering block (203) of FIG. 4.

Figures 43, 44:
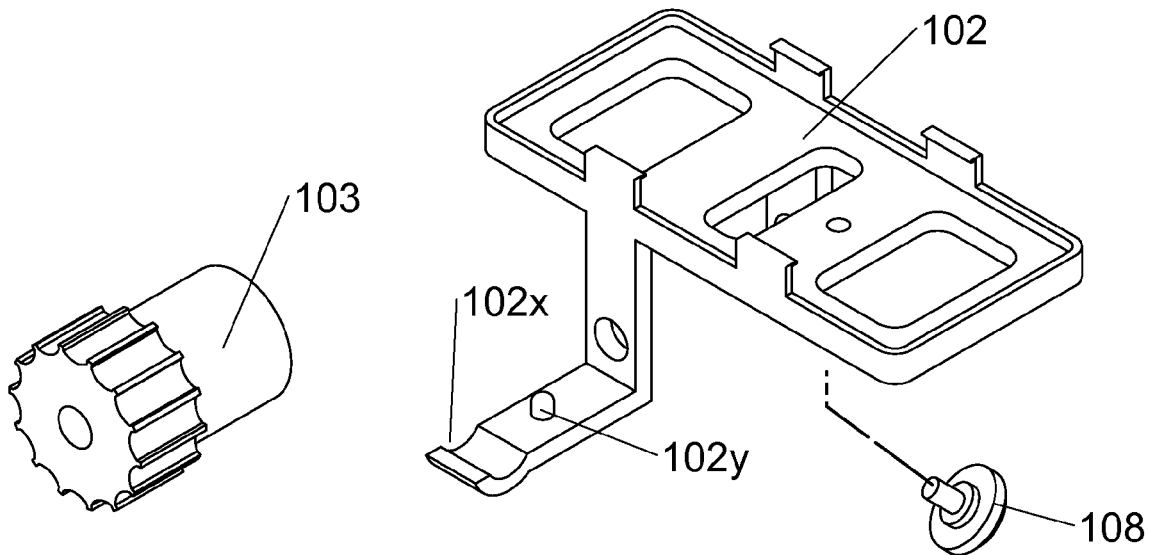
FIG. 43 is a perspective view of the clicker.
FIG. 44 is a perspective view of the device holder.

FIG. 43 is a perspective view of the clicker stop (103).

FIG. 44 is a perspective view of the device holder (102) showing the detail of the clicker arm (102x) and the clicker (102y). The bolt (108) is used to attach a device (104) of FIG. 40 to the device holder (102).

Operation

In operation, when the operator travels down a hill and shifts his or her weight from side to side using both the footpads and the handlebars, the vehicle will turn in the direction that the rider has shifted his or her weight. The hub assembly will keep the rear skis parallel and the skis will move to allow the rider to ski the edge of the skis. The rider can lift the front ski off the ground to avoid obstacles. The rider can also move the back ski tips off the ground with his or her foot to avoid obstacles. The spring action in the footpad assemblies allows the ski to return to its normal position. The handlebars can be adjusted to different angles. The handlebars also will rotate out of the way in the event the rider falls.

Conclusion, Ramifications, and Scope of Invention

Thus the reader will see that the Tri-Axial Control Device provides a highly reliable, lightweight, and compact piece of equipment. Various ages and skill levels can use it. The Tri-Axial Control Device imitates skiing, transferring skills learned to alpine skiing. The torsion control rods adjust to different angles and widths for rider control and comfort. This also allows the rider to ski steeper terrain. The front torsion control stick moves out of the way during a fall to prevent injuries. The device folds up for storage, transporting, and carrying at the ski area and onto lift. The front ski can be lifted off the ground enabling the rider to avoid obstacles with no danger of falling backwards. Rear skis have springs in the foot pedals, allowing rider to adjust angle of the skis for or aft to go over bumps and avoid obstacles. This also allows the skis or wheels to return to normal position. The control axial members allow more fluid turns at greater speeds. It is easy to manufacture and assemble. The steering wheel offers greater safety and control to the device.

While our above description contains many specificities, these should not be construed as limitations on the scope of the invention, but rather as an exemplification of one preferred embodiment thereof. Many other variations are possible. For example different sizes can be made to suit different size riders, such as children in different growth stages. A variation can also be made for the handicap. In addition to skis, wheels or floatation devices can be attached to for use on paved ground or in the water. The Tri-Axial Control Device can also be made without adjustable platforms. It can also be modified to allow the unit to become a cart for carrying objects, such as golf clubs or shopping. The ring feature on the hub allows the platform to able to tow or be towed. A kite or towrope may be attached to the hub ring to aid in motion. The aft hub ring may be used to tow a sled or ski patrol toboggan.

While this model is made consisting of mostly metals and carbon fibers, future models can be made of various types of plastic. This tri platform control device can be made in a variety of colors to suit different tastes In addition, while the mounting device for portable electrical devices is described for the Tri-axial control device, it can also be put on other vehicles, such as bicycles, scooters, golf carts, etc.

Accordingly, the scope of the invention should be determined not by the embodiments illustrated, but by the appended claims and their legal equivalents.

What is claimed is:

1. A tri-axial control device comprising:
    a steering mechanism assembly,
    said steering mechanism assembly has attached a mounting device assembly for portable electronic equipment,
    said steering mechanism assembly has attached an item selected from the group consisting of a front foot ski assembly and a front wheel assembly,
    a control axial member assembly attached to said steering mechanism assembly, said control axial member includes a bushing, a rod reset fitting, a washer, a spring, an axial control housing inserted on right and left side of forward axial control fitting held in place with a main pin, a snap cam with a spring on right and left side rests between said rod reset fitting held in place with a pin, and
    said control axial member assembly has attached on left and right sides an item selected from the group consisting of a torque rod, a linking torque rod assembly and a free ride torque control rod assembly,
    said item selected from the group consisting said torque rod, said linking torque rod assembly and said free ride torque control rod assembly has attached an item selected from the group consisting of a level pedal spring assembly, an angular spring pedal assembly, and a wheel pedal assembly.

2. The tri-axial control device of claim 1, wherein said steering mechanism assembly includes:
    an elliptical shaped steering hand loop,
    a top steering block attached to the top of said steering wheel,
    a steering lower block attached to the bottom of said steering wheel,
    an upper torsion steering stick attached to said lower steering block, and
    a lower torsion steering shaft with knob attached to said upper steering stick.

3. The tri-axial control device of claim 1, wherein said mounting device for portable electronic equipment includes:
    a base,
    a shield attached to said base, and
    a device holder attached to said base.

4. The tri-axial control device of claim 1, wherein said front foot ski assembly includes:
    a steering hinge fitting attached to said lower torsion steering shaft of claim 1,
    a forward foot attached to said steering hinge,
    a compression spring resting in said steering hinge and said forward foot,
    a ski attached to said forward foot.

5. The tri-axial control device of claim 1, wherein said front foot wheel assembly includes:
    a steering hinge fitting attached to said lower torsion steering shaft of claim 1,
    a forward foot attached to said steering hinge,
    a compression spring resting in said steering hinge and said forward foot,
    a front wheel base attached to said forward foot,
    a forward wheel attached to said front wheelbase,
    a rear wheel attached to said front wheelbase.

6. The tri-axial control device of claim 1, wherein said linking torque rod assembly includes:
    a left and right front link assembly attached to said control axial member,
    a left and right front torsion control rod attached to said front link assembly,
    a left and right aft link assembly attached to the rear of said first front torsion control rod,
    a left and right rear torsion control rod attached to said first aft link assembly.

7. The tri axial control device of claim 1, wherein said link assemblies include
    a torque rod lockend attached to torque control rod,
    a lock pin with a lock slot and a lock tooth resting inside of said torque rod lockend,
    a lock pin spring resting on said lock pin,
    a torque lockend with a key slot and a key stop attached to said torque rod lockend with a snap cam.

8. The tri-axial control device of claim 1, wherein said free ride torque control rod assembly includes:
    a first lockend attached to front of an outside torque rod,
    a second lockend attached to front of an inside torque rod,
    a third lockend attached to rear of said outside torque rod,
    a fourth lockend attached to rear of said inside torque rod,
    a first adjustment fitting attached to said first lockend and said second lockend,
    a lock pin inserted into said adjustment fitting,
    a second adjustment fitting attached to said first lockend and said second lockend, and
    a lock pin inserted into said adjustment fitting.

9. The tri-axial control of claim 1, wherein said level spring pedal assembly includes
    a ski attached to a bottom spring support,
    an upper spring support attached to said bottom spring support,
    a first pedal link and a second pedal link attached to the inside of said upper spring support and said bottom spring support,
    a torque fitting attached to the front of said bottom spring support,
    an adjustable spring fitting attached to the rear of said bottom spring support,
    a nut screwed to said adjustable spring fitting,
    a compression spring resting on the top of said nut and said spring fitting,
    a spring fitting resting on top of spring and attached to said upper spring support, said adjustable spring fitting, said nut, said compression spring, and said spring fitting held together with a pin,
    a pedal base attached to upper spring support,
    a pedal strap resting between said upper spring support and said pedal base.

10. The tri-axial control device of claim 1, wherein said angular spring pedal assembly includes
    a ski attached to a lower plate with cavities on underside,
    an upper plate with cavities on upper side attached to said lower pedal support fitting,
    four compression springs resting in said cavities,
    a torque fitting attached to said lower pedal support fitting,
    a pedal plate attached to said upper pedal support,
    a pedal strap resting between said upper pedal support and pedal plate.

11. The tri-axial control device of claim 1, wherein said wheel pedal assembly includes
    a rear wheelbase,
    a forward wheel and a rear wheel attached to said rear wheelbase,
    a wheel footpad attached to said rear wheelbase,
    a torque fitting attached to said wheel foot pad,
    a center pin resting in said torque fitting,
    a spring resting in the top of said rear wheelbase and on the top of said center pin,
    a spring resting in the bottom of said rear wheelbase and on the bottom of said center pin.

* * * * *